(12) United States Patent
Lang et al.

(10) Patent No.: US 12,035,441 B2
(45) Date of Patent: Jul. 9, 2024

(54) SYSTEM AND METHOD FOR DRIVING AND CONTROLLING LIGHT SOURCES

(71) Applicant: Schreder S.A., Brussels (BE)

(72) Inventors: Vincent Lang, Grâce-Hollogne (BE); Roxane Caprara, Neupré (BE); Benoit Kerff, Liege (BE)

(73) Assignee: Schreder S.A., Brussels (BE)

( * ) Notice: Subject to any disclaimer, the term of this patent is extended or adjusted under 35 U.S.C. 154(b) by 90 days.

(21) Appl. No.: 17/757,969

(22) PCT Filed: Dec. 22, 2020

(86) PCT No.: PCT/EP2020/087709
§ 371 (c)(1),
(2) Date: Jun. 24, 2022

(87) PCT Pub. No.: WO2021/130275
PCT Pub. Date: Jul. 1, 2021

(65) Prior Publication Data
US 2023/0024141 A1   Jan. 26, 2023

(30) Foreign Application Priority Data

Dec. 24, 2019 (NL) ...................... 2024571

(51) Int. Cl.
*H05B 47/17* (2020.01)
*H05B 47/155* (2020.01)
*H05B 47/165* (2020.01)

(52) U.S. Cl.
CPC ........... *H05B 47/17* (2020.01); *H05B 47/155* (2020.01); *H05B 47/165* (2020.01)

(58) Field of Classification Search
CPC .... H05B 47/17; H05B 47/155; H05B 47/165; H05B 45/20; H05B 47/105; Y02B 20/40
See application file for complete search history.

(56) References Cited

U.S. PATENT DOCUMENTS

2012/0287671 A1   11/2012   Parker et al.
2021/0195706 A1*   6/2021   Vissenberg ............... F21S 8/04

FOREIGN PATENT DOCUMENTS

DE   102008016097 A1   10/2009
EP       2779652 A1    9/2014
(Continued)

OTHER PUBLICATIONS

PCT International Search Report and Written Opinion, Application No. PCT/EP2020/087709, mailed Mar. 12, 2021, 14 pages.

*Primary Examiner* — Daniel D Chang
(74) *Attorney, Agent, or Firm* — McDonnell Boehnen Hulbert & Berghoff LLP

(57) ABSTRACT

Example embodiments relate to systems and methods for driving and controlling light sources. One embodiment includes a luminaire system. The luminaire system includes a support that includes a plurality of first light sources and a plurality of second light sources. The luminaire system also includes one or more first optical elements associated with the plurality of first light sources. Further, the luminaire system includes one or more second optical elements associated with the plurality of second light sources. Additionally, the luminaire system includes a drive and control means configured to drive and control the plurality of first light sources according to a first profile and the plurality of second light sources according to a second profile different from the first profile. The first profile defines a first drive output as a function of time and the second profile defines a second drive output as a function of time.

20 Claims, 10 Drawing Sheets

(56) References Cited

FOREIGN PATENT DOCUMENTS

| | | |
|---|---|---|
| GB | 2464102 A | 4/2010 |
| WO | 2014147524 A1 | 9/2014 |
| WO | 2014180647 A1 | 11/2014 |
| WO | 2019134875 A1 | 7/2019 |

* cited by examiner

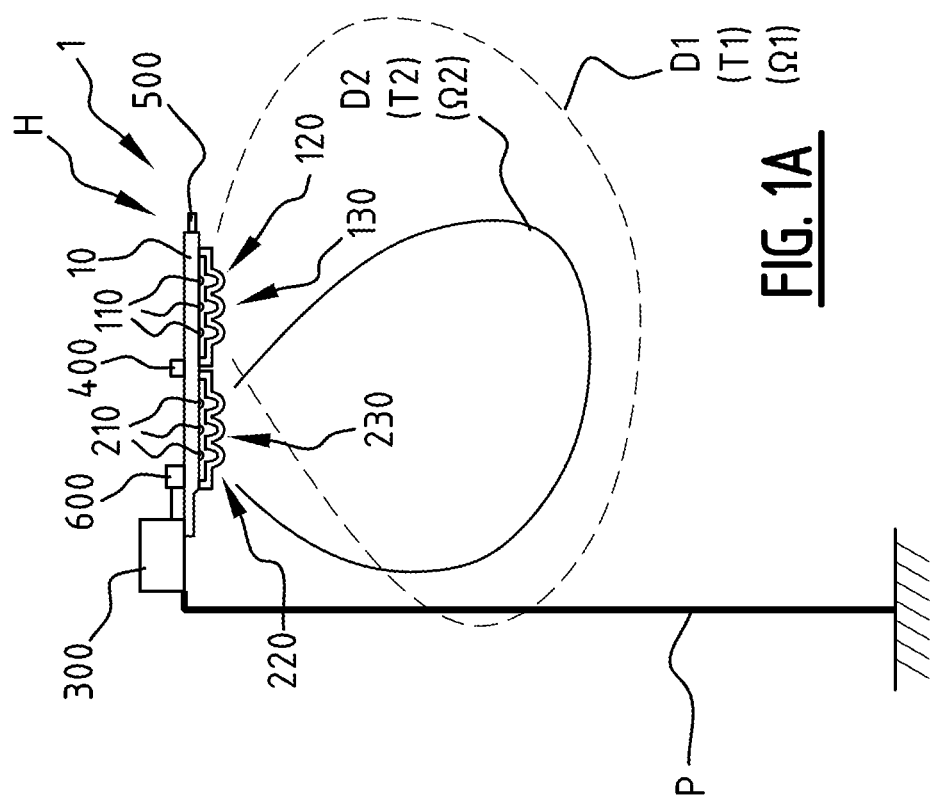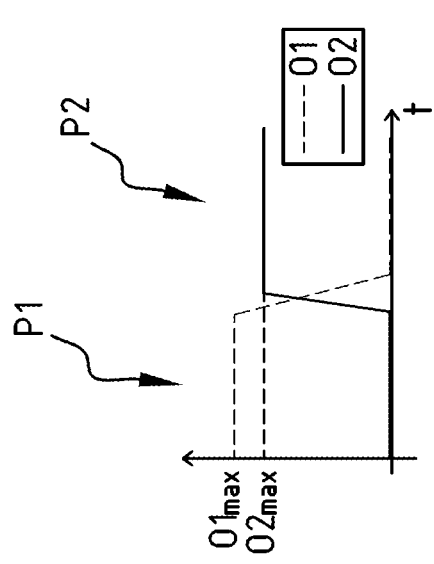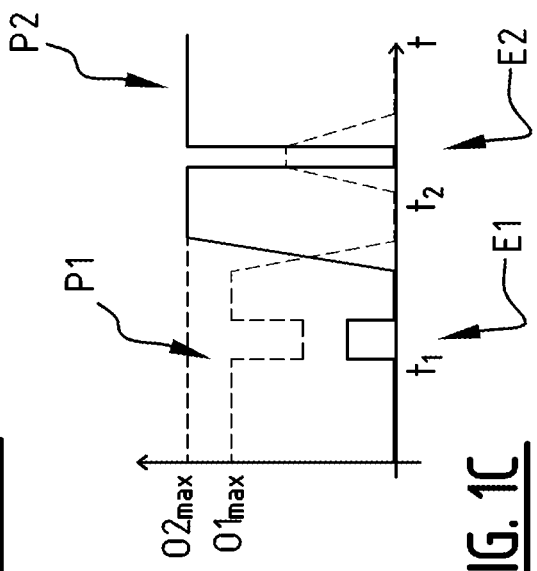

SYSTEM AND METHOD FOR DRIVING AND CONTROLLING LIGHT SOURCES

CROSS-REFERENCE TO RELATED APPLICATIONS

The present application is a national stage entry of PCT/EP2020/087709 filed Dec. 22, 2020, which claims priority to NL 2024571 filed Dec. 24, 2019. The contents of each of which are hereby incorporated by reference.

FIELD OF INVENTION

The present invention relates to luminaire systems and methods. Particular embodiments relate to a luminaire system with adjustable light color, intensity, and distribution to adapt to a desired usage.

BACKGROUND

LED devices have an increasing number of applications. Devices that are able to emit white light are especially interesting due to their potential in replacing conventional light sources, e.g. halogen, fluorescent, incandescent lights. However, with respect to an outdoor usage of lighting devices, e.g. luminaires, it is common to have different designs of lens elements, LEDs arrangements, luminaire heads, luminaires bases such as lamp posts, etc. depending on the environment that needs an illumination.

Currently, in the luminaire production, it is necessary to design a specific printed circuit board (PCB) serving as a support for light sources of a specific color and/or color temperature together with a specific optical element type and shape for each luminaire application, e.g. pedestrian road, highway, one-way road, etc. The overall design depends notably on the desired lighting pattern on the surface to be illuminated, i.e., the desired shape of the light onto the illuminated surface. Such approach is costly, time consuming, and requires extensive stock keeping. It would therefore be advantageous to be able to design a luminaire system with a more adaptive approach for which the light color, intensity, and photometry can be modified at the same time on site and/or at the factory, depending on the desired application and the desired intensity distribution.

Several solutions exist for outdoor lighting equipment presenting optical elements adjustable on an individual basis or within relatively restricted boundaries. However, the flexibility of use of the luminaire systems remains limited and there is a need for a luminaire system which can be adapted to each site and desired usage.

SUMMARY

The object of embodiments of the invention is to provide a luminaire system whose light color temperature and intensity distribution can be varied and which is more adaptable to each site to be illuminated and/or to a specific application. More in particular, embodiments of the invention aim to provide a luminaire system for which the light color temperature and intensity distribution can be adjusted on site, depending on the site to be illuminated and/or the specific application and/or the environmental conditions and/or the time of the day.

Embodiments of the invention also provide a method for driving and controlling such a luminaire system.

According to a first aspect of the invention, there is provided a luminaire system. The luminaire system comprises a support comprising a plurality of first light sources and a plurality of second light sources, one or more first optical elements associated with the plurality of first light sources, one or more second optical elements associated with the plurality of second light sources, and a drive and control means configured to drive and control the plurality of first light sources according to a first profile and the plurality of second light sources according to a second profile different from the first profile. The first profile defines a first drive output as a function of time and the second profile defines a second drive output as a function of time. The plurality of first light sources and the one or more first optical elements are configured to output a first light beam having a first color temperature according to a first intensity distribution within a first solid angle. The plurality of second light sources and the one or more second optical elements are configured to output a second light beam having a second color temperature according to a second intensity distribution within a second solid angle, said second intensity distribution being different from the first intensity distribution. Also, the second color temperature is different from the first color temperature. Preferably, the one or more first and second optical elements are also mounted on the support.

Embodiments of the invention are based inter alia on the insight that different outdoor illumination situations typically demand for different luminaires having different specific features such as LEDs of a particular type, disposed within a specific arrangement on a support, and connected to each other by a specific routing, together with particular optics arrangement (e.g. lens, reflector, collimator, etc.). Installing different types of luminaires makes the installation task complicated. Moreover it adds the disadvantage of having to store many different parts for production and/or for maintenance. This problem is overcome by a luminaire system as defined above.

In the luminaire system of embodiments of the invention, the power supplied to the plurality of first light sources and to the plurality of second light sources is controlled by the drive and control means based on a first and second profile as defined above, which allows obtaining a variety of intensity distributions having different temperature colors. Selectively driving the power provided to the plurality of first and second light sources will allow as a result controlling the intensity distribution of the luminaire system. Indeed, the drive and control means will allow to provide power to the plurality of first light sources and/or the plurality of second light sources in accordance with the first profile and the second profile. It is to be noted that part or the entirety of the plurality of first and second light sources may be switched on in a shared time frame and may be driven independently by the drive and control means. Thus, the luminaire system may emit a light beam with a different color temperature, size, shape, and/or intensity distribution depending on which of the plurality of first light sources and the plurality of second light sources are driven by the drive and control means, how the plurality of first and second light sources are driven. It makes the luminaire system very versatile and removes the need of having different luminaires for different outdoor illumination situations. Moreover, the luminaire system of the present invention may offer a more continuous scope of light color temperatures and intensity distributions compared to what was available with the different prior luminaires systems adapted to specific outdoor illumination situations.

The light emitted by the plurality of first and second light sources arranged on the support will be influenced in a certain manner by the one or more first and second optical elements associated with the plurality of first and second light sources, respectively. In addition, the color temperature of light emitted by the luminaire system and its intensity distribution may be correlated to the different profiles according to which the drive and control means drives and controls the plurality of first light sources and the plurality of second light sources, respectively. In such a way, the color temperature of light emitted by the luminaire system and its intensity distribution can be adapted more easily to different sites and/or applications. In particular, embodiments of the invention allow a dynamic adaptation of the light color temperature and intensity distribution of the luminaire system based e.g. on changes occurring in its environment. By intensity distribution, it is meant the distribution of the luminous intensity (expressed in candela, cd; or lumen/steradian, lm/sr) as a function of the emission direction of the light leaving the luminaire system. The intensity distribution is contained within a spatial envelope of the emitted light. A first conical envelope delimits the light emitted by the plurality of first light sources through the one or more first optical elements, and defines a first solid angle. A second conical envelope delimits the light emitted by the plurality of second light sources through the one or more second optical elements, and defines a second solid angle.

The solid angle, denoted as $\Omega$, is a measure of the amount of the field of view from some particular point that a given object covers. The point from which the object is viewed is called the apex of the solid angle, and the object is said to subtend its solid angle from that point. In the International System of Units (SI), a solid angle $\Omega$ is expressed in a dimensionless unit called a steradian (sr). One steradian corresponds to one unit of area on the unit sphere surrounding the apex. In particular, the solid angle $\Omega$ of a cone with its apex at the apex of the solid angle $\Omega$, and with apex angle $2\theta$, is the area of a spherical cap on a unit sphere equal to $\Omega=2\pi(1-\cos\theta)=4\pi\sin^2(\theta/2)$.

The color temperature of a light source is the temperature of an ideal black-body radiator that radiates light of a color comparable to that of the light source. Color temperature is meaningful for light in a range going from red to orange to yellow to white to blueish white. Color temperature is conventionally expressed in kelvins, K. Color temperatures over 5000 K are called "cool colors" (bluish), while lower color temperatures (2700-3000 K) are called "warm colors" (yellowish). In the present invention, the plurality of first light sources and the plurality of second light source have different color temperatures. Embodiments of the luminaire system make it possible to adapt its light color temperature in order to temporarily output a light beam having a different color temperature. It is therefore possible, for example, for a footpath or cycle path to be illuminated by changing the light color temperature during the passage of a cyclist or pedestrian, or of a nocturnal animal such as a bat or a frog. Other applications that may require adaptation of the light color temperature and intensity distribution are e.g. the presence of inclement weather conditions such as fog, footpath or cycle path, or the passage of vehicles or pedestrians inside a tunnel.

Moreover, exemplary embodiments of the luminaire system according to the invention also present the advantage to be able to vary overtime its light color temperature and intensity distribution once installed in its final outdoor location, in accordance with changes occurring in its environment. Further, with an embodiment of such a luminaire system it is, for example, possible to adapt its light color temperature and intensity distribution during rainy weather with a wet and highly reflective roadway surface in such a way that the traffic is not dazzled. Furthermore, another embodiment of the luminaire system makes it possible to adapt its intensity distribution in order to temporarily deflect part of the luminous flux onto normally unlit sections. It is therefore possible, for example, for a footpath or cycle path to be illuminated by changing the intensity distribution during the passage of a cyclist or pedestrian.

Hence, a variable light color temperature together with a variable intensity distribution of the luminaire system in embodiments of the present invention can therefore be used to reduce light pollution and/or to reduce negative impact of undesirable lighting on a dark sky and/or to protect the fauna and flora and/or to achieve safer and at the same time more energy-saving illumination of the respective outdoor situation.

Preferably, the plurality of first and second light sources is a plurality of LEDs. The first and second drive outputs are then preferably defining a first and second output current for driving the first and second plurality of LEDs. Thus the first and second intensity distribution can be changed by changing the first and second output current.

Preferably, the luminaire system is included in a luminaire head. The support may be fixed in the luminaire system, preferably in said luminaire head. This arrangement allows heat dissipation of the support via thermal contact with the luminaire head.

Preferred embodiments relate to a luminaire system of an outdoor luminaire By outdoor luminaire, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas, access roads to private building infrastructures, etc.

According to a preferred embodiment, the plurality of first light sources is configured to emit light having the first color temperature and the plurality of second light sources is configured to emit light having the second color temperature. In general it is noted that any one of the first/second light sources and the one or more first/second optical elements, or both, may influence the light color temperature of the generated first/second beam. However, in a specific embodiment, each first light source is configured to emit light having the first color temperature and each second light source is configured to emit light having the second color temperature. Such embodiments allow for a less complex driving of the light sources.

Preferably, the difference between the first color temperature and the second color temperature is larger than 300 K, more preferably larger than 500 K, even more preferably larger than 700 K, and for example larger than 1000 K. Such color temperature differences allow addressing different illumination needs in a convenient manner.

In an exemplary embodiment, the first color temperature is above 2700 K and the second color temperature is below 2700 K. Such first color temperature allows obtaining a relatively white first light beam and a rather yellow or amber second light beam, as well as combinations thereof.

According to a preferred embodiment, the one or more second optical elements are different from the one or more first optical elements.

In this way, different optical elements enable to produce different intensity distributions, thereby enabling the adaptation of the photometry of the luminaire system according to different outdoor situations. Optionally, the difference between the first and the second optical elements may also contribute to a difference between the first and the second color temperature, but in preferred embodiments the color difference is caused by the difference between the first and the second light sources. According to another embodiment, the one or more second optical elements are the same as the one or more first optical elements, and the photometry of the luminaire system is adapted by varying the amount of first and/or second light sources that are driven by the drive and control means in order to emit light. According to yet another embodiment, the one or more first optical elements may be different from the one or more second optical elements and the amount of first light sources that are driven may be different from the amount of second light sources. In another exemplary embodiment, the one or more first and second optical elements may be the same, but the plurality of first light sources may be arranged differently with respect to the one or first optical elements as compared to the arrangement of the plurality of second light sources with respect to the one or second optical elements.

In a possible embodiment the one or more first optical elements and/or the one or more second optical elements may be arranged in a movable manner. For example, the one or more first optical elements may be movable relative to the support via a first moving means, and/or the one or more second optical elements may be movable relative to the support via a second moving means. In such an embodiment, the one or more second optical elements may be moved relative to the support in order to modify the second intensity distribution. Such moving means may allow for a fine-tuning of the first and/or second intensity distribution.

In another exemplary embodiment, a first and second light source may be arranged together under one integral optical structure integrating both the first and the second optical element. For example, a first and second light source may be arranged together under a so-called double bulged lens. This is a lens element having an internal surface facing the first and the second light source. The internal surface and/or the external surface comprises a first curved surface and a second curved surface, said first curved surface being connected to said second curved surface through a connecting surface or line comprising a saddle point or discontinuity. When the external surface is implemented as described, preferably the external surface comprises a first outwardly bulging surface, a second outwardly bulging surface, and an external connecting surface or line connecting said first and second outwardly bulging surfaces. However, it is also possible to have a continuous outer surface and to implement only the internal surface as described. When the internal surface is implemented as described, preferably the internal surface comprises a first outwardly bulging surface, a second outwardly bulging surface, and an internal connecting surface or line connecting said first and second outwardly bulging surfaces. The term "outwardly bulging surface" is used here to refer to a surface which bulges outwardly, away from the associated light source. An outwardly bulging external surface forms a protruding portion, whilst an outwardly bulging internal surface forms a cavity facing the associated light source. By providing such curved surfaces, the optical elements are given a "double bulged" shape allowing to generate a distinct intensity distribution for the first beam associated with the first light sources (each located below a first bulge of a double bulged surface) and the second beam associated with the second light sources (each located below a second bulge of a double bulged surface). Examples of such double bulged surfaces are disclosed in PCT publication WO2019134875A1 in the name of the applicant which is included herein by reference.

According to a preferred embodiment, a maximal value of the second drive output is lower than a maximal value of the first drive output. In that manner the luminous flux, also called the luminous power (expressed in lumen, lm; or candela steradian, cd.sr) of the second light beam may be lower than the luminous flux of the first light beam.

Hence, depending on the outdoor situation, the drive and control means is configured to reduce the drive output of the luminaire system, i.e. to dim the luminaire system, from a maximal value of the first drive output according to the first profile to a maximal value of the second drive output according to the second profile, the latter maximal value being lower than the maximal value of the first drive output.

Outdoor situations that may require such a dimming may be e.g. the presence of a nocturnal animal, or the presence of inclement weather conditions such as fog, or the lighting of a luminaire during night in a city center in order to reduce light pollution at night causing discomfort for the inhabitants. In the case of the lighting of a luminaire in a city center, up to a certain time, e.g. midnight, the drive and control means is configured to drive the plurality of first light sources of a first color temperature, e.g. white, according to the first profile at the maximal value of the first drive output. Beyond that time, e.g. during night, the drive and control means is configured to drive the plurality of second light sources of a second color temperature, e.g. yellow or amber, different from the first color temperature according to the second profile at the maximal value of the second drive output, the latter maximal value being lower than the maximal value of the first drive output.

According to an exemplary embodiment, the plurality of first and second light sources and the one or more first and second optical elements are configured such that the luminous flux, also called luminous power (expressed in lumen, lm; or candela steradian, cd.sr) within a region of the first solid angle $\Omega 1$ between 0 and $\pi$ sr is comprised between 60% and 75% of the total luminous flux caused by the first drive output; and/or such that the luminous flux within a region of the second solid angle $\Omega 2$ between 0 and $\pi$ sr is comprised between 75% and 90% of the total luminous flux caused by the second drive output. A solid angle $\Omega$ equal to $\pi$ sr corresponds to a cone with half-apex angle $\theta$ equal to 60°.

Hence, depending on the outdoor situation, the luminaire system is configured such that a second light beam can be emitted with reduced light intensity at large solid angles, i.e., at possible glaring angles, and with increased light intensity at lower solid angles, i.e., at non-glaring angles, whilst the first light beam is more evenly spread. The redistribution of the light intensity within a solid angle may correspond to a collimation of the second light beam with respect to the first light beam.

Outdoor situations that may require such light intensity redistribution are e.g. the presence of a nocturnal animal, or the presence of inclement weather conditions, or the lighting of a luminaire during night in a city center in order to reduce light glares at night causing discomfort for the inhabitants.

According to a preferred embodiment, the second color temperature is lower than the first color temperature.

For example, as described above the plurality of first light sources may have a bright white color (that may be classified as "cool color") before midnight and the plurality of second light sources may have a yellow or amber color (that may be classified as "warm color") during night. According to another application for use in snow rich regions, such as skiing areas or stations, the warm color may be used for example during the snow/skiing period and a cool color may be used for example during the rest of the year.

According to an exemplary embodiment, the first color temperature is comprised between 2700 K and 4000 K and the second color temperature is comprised between 1500 K and 2700 K.

According to a preferred embodiment, the second solid angle is smaller than the first solid angle.

In this particular case, the transition of the first intensity distribution to the second intensity distribution corresponds to a collimation of the second light beam with respect to the first light beam, since the first light beam has the first solid angle and the second light beam has the second solid angle which is smaller than the first solid angle.

Outdoor situations that may require such a collimation are e.g. the presence of a nocturnal animal, or the presence of inclement weather conditions, or the lighting of a luminaire during night in a city center in order to reduce light glares at night causing discomfort for the inhabitants.

According to an exemplary embodiment, the first solid angle is comprised between $3\pi/2$ sr and $2\pi$ sr and the second solid angle is comprised between $\pi$ sr and $3\pi/2$ sr. A solid angle $\Omega$ equal to $2\pi$ sr corresponds by definition to a half sphere, and a solid angle $\Omega$ equal to $3\pi/2$ sr corresponds to a cone with half-apex angle $\theta$ equal to 75.5°.

According to a preferred embodiment, the first intensity distribution and the second intensity distribution at least partially overlap.

According to a preferred embodiment, the drive and control means is configured to perform a transition from driving only the plurality of first light sources to driving only the plurality of second light sources, and vice versa. Preferably, the transition is progressive. For example, the transition period during which both the first and the second light sources are on at a reduced level may be larger than 1 minute, preferably between 1 minute and 120 minutes, more preferably between 1 minute and 60 minutes.

In this manner, the luminaire system can be used in two different modes for two different illumination situations. A first mode for which the plurality of first light sources is switched on will allow adapting to a first illumination situation. A second mode for which the plurality of second light sources is switched on will allow adapting to a second illumination situation. For example, the drive and control means may vary the first drive output according to the first profile such that it passes from a maximal value to a value zero, or near zero, whilst it may vary the second drive output according to the second profile such that it passes from a value zero, or near zero to a maximal value. Preferably, this passing from a maximal value to a value zero, or near zero, or vice versa, is preferably done in a gradual way.

According to a preferred embodiment, the drive and control means is configured to gradually decrease the first drive input whilst gradually increasing the second drive input, and vice versa.

Hence, there may exist a time period during which the drive and control means simultaneously drive the plurality of first light sources and the plurality of second light sources. During that time period, the light color temperature of the luminaire system is a mix of the first color temperature and the second color temperature, and the intensity distribution of the luminaire system is a mix of the first intensity distribution and the second intensity distribution. During that time period, there may exist at least one time at which the first profile crosses the second profile, i.e., at least one time at which the first drive output equals the second drive output.

According to an exemplary embodiment, the drive and control means is configured to drive the plurality of first light sources with a non-zero first drive input whilst driving the plurality of second light sources with a non-zero second drive input during a predetermined period of time. During such time period, the light color temperature of the luminaire system is a mix of the first color temperature and the second color temperature, and the intensity distribution of the luminaire system is a mix of the first intensity distribution and the second intensity distribution. During such time period, the non-zero value for the first and second drive output may be constant or may vary to obtain color variations and/or intensity distribution variations in function of time.

According to an exemplary embodiment, the drive and control means comprises a first driver configured to drive the plurality of first light sources and a second driver configured to drive the plurality of second light sources.

In this way, the driving of the plurality of first light sources may be performed independently from the driving of the plurality of second light sources. The first and second driver may share a common controller inside the drive and control means, to control the first and second driver. In another embodiment, there may be only one driver, which corresponds e.g. to a multi-channel driver able to drive the plurality of first light sources and the plurality of second light sources.

According to a preferred embodiment, the luminaire system further comprises a sensing means, and the drive and control means is configured to vary the first drive output and/or the second drive output based on data sensed by the sensing means.

In this manner, the sensing means can obtain a variety of relevant data that help the drive and control means adjust the first drive output and/or the second drive output in order to obtain a specific desired light color temperature and intensity distribution. For example, depending on the sensed data, the drive and control means may vary the first drive output according to the first profile such that it passes from a maximal value to a value near zero, whilst it may vary the second drive output according to the second profile such that it passes from a value near zero to a maximal value. Hence, the drive and control means may perform the transition, preferably in a progressive way, from driving the plurality of first light sources to driving the plurality of second light sources, and vice versa, based on the sensed data. In other words, the drive and control means may decrease, e.g. gradually or abruptly, the first drive output from said maximal value to said value near zero whilst increasing, e.g. gradually or abruptly the second drive output, and vice versa, based on the sensed data. Also, the drive and control means may be configured to modify the first profile and/or the second profile based on the sensed data. This may be achieved by storing a number of profiles, and selecting an appropriate profile in function of the sensed data.

According to an exemplary embodiment, the sensing means comprises any one or more of a presence or motion sensor, an optical sensor, such as an ambient light sensor or an image sensor, an ambient visibility sensor, a traffic sensor, a pollution sensor such as a dust particle sensor, a sound sensor, an image sensor such as a camera, a radar such as a Doppler effect radar, a LIDAR, an astroclock, a temperature sensor, a humidity sensor, a ground condition measurement sensor such as a ground reflectivity sensor, a lighting pattern sensor, a speed detection sensor, an antenna, an RF sensor, a vibration sensor, a metering device, an alarm device such as a panic button, a malfunctioning sensor, a measurement device for measuring a maintenance related parameter of the luminaire system.

The above-mentioned types of sensors may be used for example in the above-mentioned outdoor situations.

According to an exemplary embodiment, the luminaire system comprises an environment sensing means configured to sense environmental data. The drive and control means may be configured to vary the first drive output and/or the second drive output based on the sensed environmental data. The environment sensing means may be provided to the luminaire head or to another component of the luminaire system, e.g. to a pole, or near the luminaire.

In this way, the environment sensing means can sense environmental data, e.g. luminosity, visibility, weather condition, sound, dynamic object (presence and/or speed and/or type and/or number), ground condition such as a ground reflectivity property, humidity, temperature, a lighting pattern, etc. of the surroundings of the luminaire system. The environment sensing means may already be provided to the luminaire system or may be added in a later phase of the luminaire system installation. Varying the first drive output and/or the second drive output based on the sensed environmental data may allow changing the intensity distribution, and thus the lighting pattern of the luminaire system in accordance with the sensed environmental data in a more dynamic manner, e.g. adapting an intensity distribution and/or color temperature to weather conditions, changing to a lighting pattern more adapted for a passing cyclist, etc.

According to an embodiment, the luminaire system comprises a pattern sensing means, e.g. a camera, configured to acquire a measure for a lighting pattern produced by the luminaire system. The drive and control means may be configured to vary the first drive output and/or the second drive output based on the acquired measure. The pattern sensing means may be provided to a luminaire head or to another component of the luminaire system, e.g. to a pole of the luminaire, or at a location near the luminaire, e.g. to a mobile device of a person in the area of the luminaire.

In this manner, the pattern sensing means can acquire a measure of a lighting pattern associated with the one or more first and second optical elements. Then, varying the first drive output and/or the second drive output based on the acquired measure will enable a more adapted lighting pattern to be achieved relative to the current environment of the luminaire system.

According to an embodiment with a feedback loop, the drive and control means may correct, and more in particular may regularly or continuously correct the variation of the first drive output and/or the second drive output based on sensed data, e.g. data from the pattern sensing means or data from the environment sensing means.

According to a preferred embodiment, the luminaire system further comprises a receiving means configured to receive a message from a remote location, and the drive and control means is configured to vary the first drive output and/or the second drive output based on the received message. It is noted that also data from any sensing means of nearby luminaires may be taken into account when varying the first and/or second drive output. For example, if a luminaire is positioned between two other luminaires, the lighting patterns thereof may partially overlap. The lighting pattern measured by the central luminaire may also be used to vary the first and/or second drive output for the other two luminaires.

For example, an electronic device such as a smartphone, a tablet, a laptop and the like, that is located at the remote location may send one or more messages to the luminaire system via an application installed on the electronic device. The messages may contain relevant data that help the drive and control means adjust the first drive output and/or the second drive output in order to obtain a specific desired light color temperature and intensity distribution. It is noted that also messages sent by nearby luminaires may be taken into account when correcting said variations.

According to an exemplary embodiment, the luminaire system further comprises a storing means configured to store a plurality of drive profiles, and the drive and control means is configured to select one of the stored profiles and to vary the first drive output and/or the second drive output according to the selected drive profile. Thus, the first profile and the second profile may be set according to one of the selected drive profiles. For example, the drive and control means may be configured to select a drive profile among the plurality of stored drive profiles based on sensed data and/or based on a received message.

In a possible embodiment, the plurality of first light sources is connected such that subsets thereof can be powered individually and/or the plurality of second light sources is connected such that subsets thereof can be powered individually. In such case, the stored drive profiles may comprise information about the number of first light sources and/or the number of second light sources to be powered and/or about a position of subsets of first light sources and/or a position of subsets of second light sources to be powered. However, in more simple embodiments of the invention, the plurality of first light sources is always powered in common, and the plurality of second light sources is always powered in common.

It is noted that the stored drive profiles may be linked to certain data, e.g. sensed and/or received and/or programmed data. For example, the control and drive means may be programmed so that the date is available in the luminaire system, and the various drive profiles may be linked to a certain dates of the year or to a certain period of the year. For example, the selected first and/second profile may be different depending on whether it is the Christmas period, or a festival period, etc.

The first and second light sources may be arranged on a single printed circuit board. However, according to another exemplary embodiment, the support comprises a first printed circuit board comprising the plurality of first light sources and a second printed circuit board comprising the plurality of second light sources. In this way, replacement or maintenance of the luminaire system is made easier.

It is noted that the plurality of first light sources may be arranged as a first array on the support located adjacent a second array comprising the plurality of second light sources. However, in another embodiment, the first and the second light sources may be alternated e.g. according to a checkerboard pattern or according to a line pattern with a row or column of second light sources being located between two rows or columns of first light sources. Further, each light source may be associated with one or more optical elements (e.g. a lens and/or a reflector), or a number of light sources may share one or more optical elements (e.g. one reflector and/or one lens and/or one diffusor for multiple light sources).

In a preferred embodiment, a distance between adjacent first light sources seen in a row direction is substantially constant and a distance between adjacent first light sources seen in a column direction perpendicular on the row direction is substantially constant. More preferably the distance in the row and column direction may be the same. Similarly, a distance between adjacent second light sources seen in a row direction may be substantially constant and a distance between adjacent second light sources seen in a column direction perpendicular on the row direction may be substantially constant. More preferably the distance in the row and column direction may be the same.

In a preferred embodiment, the plurality of first light sources comprises multiple first sets each comprising one or more adjacent first light sources and the plurality of second light sources comprises multiple second sets each comprising one or more adjacent second light sources. Preferably the first and second sets are arranged such that each first set is adjacent to at least two second sets. More preferably, the first and the second sets are arranged according to a checkerboard pattern. It is noted that the tiles (corresponding with the sets) of the checkerboard pattern may be rectangular or square. Also, rows of the checkerboard pattern may be shifted with respect to each other. Preferably, each set of one or more first light sources comprises at most four first light sources, e.g. two first light sources or one first light source. Preferably, each set of one or more second light sources comprises at most four second light sources, e.g. two second light sources or one second light source. However, also larger sets are possible. By using such patterns a combined beam based on the first and second beam can be obtained in an improved manner, in particular with an improved color mixing.

According to an exemplary embodiment, the one or more first optical elements comprise a plurality of first lens elements associated with the plurality of first light sources and the one or more second optical elements comprise a plurality of second lens elements associated with the plurality of second light sources.

Indeed, lens elements may be typically encountered in outdoor luminaire systems, although other types of optical elements may be additionally or alternatively present in such luminaires systems, such as reflectors, backlights, prisms, collimators, diffusors, and the like. In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface or with a diffusive portion.

Alternatively, the one or more first and/or second optical elements could be a transparent or translucent cover having varying optical properties (e.g. variation of thickness, transparency, diffusivity, reflectivity, refractivity, color temperature, etc.).

Additionally, the one or more first and/or second optical elements may further comprise one or more light shielding structures complying with different glare classifications, e.g. the G classification defined according to the CIE115:2010 standard and the G* classification defined according to the EN13201-2 standard. The light shielding structures may be configured for reducing a solid angle of light beams of the plurality of first and/or second light sources by cutting off or reflecting light rays having a large incident angle, thereby reducing the light intensities at large angles and improving the G/G* classification of the luminaire system. The one or more first and/or second optical elements may comprise on the one hand a lens plate comprising a plurality of lenses covering the plurality of first and/or second light sources, and on the other hand one or more light shielding structures mounted on said lens plate.

According to an embodiment, the light shielding structures may comprise a plurality of closed reflective barrier walls, each having an interior bottom edge disposed on a flat portion of a lens plate, an interior top edge at a height above said flat portion, and a reflective surface connecting the interior bottom edge and the interior top edge and surrounding one or more associated lenses of a plurality of lenses. The height may be at least 2 mm, preferably at least 3 mm. The interior bottom edge defines a first closed line and the interior top edge defines a second closed line. Preferably, the first closed line and the second closed line comprising at least one curved portion over at least 15%, preferably over at least 20%, more preferably over at least 25%, of a perimeter of said first closed line and a perimeter of said second closed line, respectively. The reflective surface is configured for reducing a solid angle $\Omega$ of light beams emitted through the one or more associated lenses of said plurality of lenses. Exemplary embodiments of shielding structures are disclosed in patent application NL2023295 in the name of the applicant which is included herein by reference.

According to another embodiment, the light shielding structures may comprise a plurality of reflective barriers, each comprising a base surface disposed on a flat portion of a lens plate, a top edge at a height above said base surface, and a first reflective sloping surface connecting the base surface and the top edge and facing one or more associated lenses of a plurality of lenses comprised in the lens plate. The first reflective sloping surface may be configured for reflecting light rays emitted through one or more associated first lenses of said plurality of lenses having a first incident angle with respect to an axis substantially perpendicular to the base surface between a first predetermined angle and 90°, with a first reflection angle with respect to said axis smaller than 60°. The first predetermined value may be a value below 90°. In other words, when the first incident angle is between the first predetermined value and 90°, the first reflective sloping surface reflects the incident ray such that the reflected ray has a reflection angle with respect to said axis smaller than 60°. According to an embodiment, at least one reflective barrier of the plurality of reflective barriers further comprises a second reflective sloping surface opposite the first reflective sloping surface, configured for reflecting light rays emitted through one or more associated second lenses of said plurality of lenses adjacent to the one ore more first lenses associated with the first reflective sloping surface, having a second incident angle with respect to an axis substantially perpendicular to the base surface comprised between a second predetermined angle and 90°, with a second reflection angle with respect to said axis smaller than 60°. Exemplary embodiments of shielding structures are disclosed in patent application PCT/EP2019/074894 in the name of the applicant which is included herein by reference. Further examples of louver elements are disclosed in PCT patent application PCT/EP2020/066221 and Dutch application N2025168 in the name of the applicant, which are included herein by reference. Further, a spacer layer may be disposed between the carrier and the one or more optical elements. The spacer layer is provided with one or more holes through which one or more light emitting elements of the light source extend. Examples of spacer layers are disclosed in Dutch patent application N2025166 in the name of the applicant, which is included herein by reference.

According to a preferred embodiment, the one or more first optical elements and the one or more second optical elements are integrated in an optical plate. In this manner, the optical elements can be more easily replaced in case of maintenance.

According to an exemplary embodiment, the optical plate comprises a first optical plate integrating the one or more first optical elements and a second optical plate integrating the one or more second optical elements.

However, it is also possible to have individual optical elements per light source, e.g. an individual lens element per light source. Also, it is possible that an optical plate containing both first and second optical elements. In the latter case, the first and second optical elements may be arranged close to each or even integrated in a so-called double bulged lens element as described above.

According to a preferred embodiment, the plurality of first light sources is arranged in a two-dimensional array of at least two rows and at least two columns and the plurality of second light sources is arranged in a two-dimensional array of at least two rows and at least two columns.

In this way, the mounting and connecting of the plurality of first and second light sources on the support are simplified. Similarly, the one or more first and second optical elements may be respectively arranged in a two-dimensional array of at least two rows and at least two columns.

According to an embodiment wherein the one or more first and second optical elements respectively comprise a plurality of first and second lens elements, optionally in combination with any one of the embodiments described above, a lens element of the plurality of first and second lens elements has a first surface and a second surface located on opposite sides thereof. The first surface is a convex or planar surface and the second surface is a concave or planar surface facing a light source of the plurality of first and second light sources, respectively.

In this manner, the light source placed at the second surface side of the lens element has its emitted light being spread. The shape of the lens element and position of the lens element with respect to the light source will influence the intensity distribution of the emitted light.

According to a second aspect of the invention, there is provided a method for driving and controlling a plurality of first light sources having a first color temperature and a plurality of second light sources having a second color temperature different from the first color temperature in a luminaire system. The method comprises driving and controlling the plurality of first light sources according to a first profile, said first profile defining a first drive output as a function of time, to emit a first light beam through one or more first optical elements to obtain a first intensity distribution within a first solid angle, and driving and controlling the plurality of second light sources according to a second profile different from the first profile, said second profile defining a second drive output as a function of time, to emit a second light beam through one or more second optical elements to obtain a second intensity distribution within a second solid angle, said second intensity distribution being different from the first intensity distribution.

The skilled person will understand that the hereinabove described technical considerations and advantages for the system embodiments also apply to the below described corresponding method embodiments, mutatis mutandis.

According to a preferred embodiment, the one or more second optical elements are different from the one or more first optical elements.

According to a preferred embodiment, a maximal value of the second drive output is lower than a maximal value of the first drive output.

According to a preferred embodiment, the second color temperature is lower than the first color temperature.

According to an exemplary embodiment, the first color temperature is comprised between 2700 K and 4000 K and the second color temperature is comprised between 1500 K and 2700 K.

According to a preferred embodiment, the second solid angle is smaller than the first solid angle. For example, the first solid angle is comprised between $3\pi/2$ sr and $2\pi$ sr and the second solid angle is comprised between $\pi$ sr and $3\pi/2$ sr.

According to a preferred embodiment, the method comprises performing a transition from the driving of the plurality of first light sources to the driving of the plurality of second light sources, and vice versa. Preferably, the transition is progressive.

According to a preferred embodiment, the method comprises gradually decreasing the first drive output whilst gradually increasing the second drive output, and vice versa.

According to an exemplary embodiment, the driving of the plurality of first light sources and the driving of the plurality of second light sources are performed independently.

According to a preferred embodiment, the method comprises sensing data and varying the first drive output and/or the second drive output based on the sensed data.

According to an exemplary embodiment, the data comprises data related to any one or more of a presence and/or speed and/or type and/or number of a moving object, an intensity of ambient light, a degree of ambient visibility, traffic intensity e.g. on a road, a presence of dust particles, a sound, time e.g. from astronomical data, an image, a temperature, a humidity level, a ground condition such as a ground reflectivity, a lighting pattern, a day of the year, luminosity, weather condition, an alarm signal, a measurement of a metering device, measured vibration, a maintenance related parameter, etc.

According to a preferred embodiment, the method comprises receiving a message from a remote location and varying the first drive output and/or the second drive output based on the received message.

According to a preferred embodiment, the method comprises storing a plurality of drive profiles and varying the first drive output and/or the second drive output based on a selected drive profile of the plurality of stored drive profiles. The method may comprise selecting a drive profile among the plurality of stored drive profiles based on sensed and/or received data.

According to an exemplary embodiment, the stored control profiles comprise information about the amount of first light sources and of second light sources.

According to a third aspect of the invention, there is provided a computer program product comprising computer-executable instructions for performing the method according to any one of the above-mentioned embodiments, when the program is run on a computer.

It will be understood by the skilled person that the features and advantages disclosed hereinabove with respect to embodiments of the method may also apply, mutatis mutandis, to embodiments of the computer program product.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

FIGS. 1A-1E illustrate schematically an exemplary embodiment of a luminaire system.

DESCRIPTION OF THE FIGURES

Figure 1D:
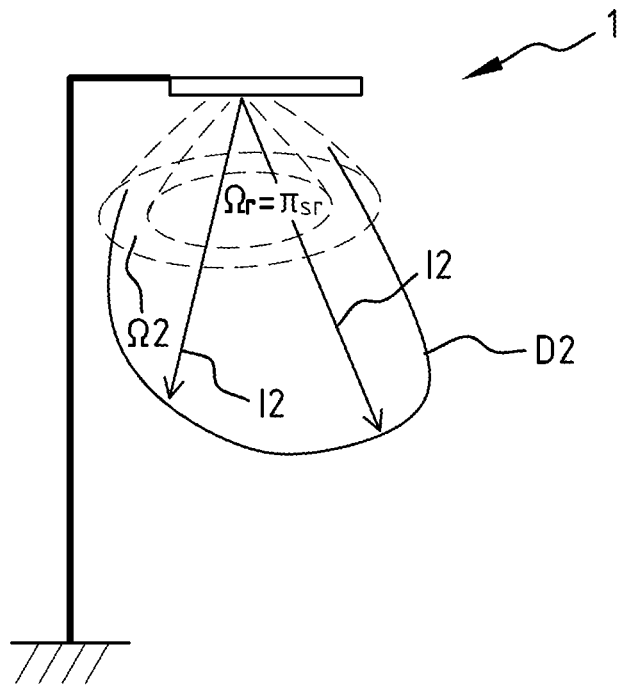

FIG. 1A illustrates a luminaire system 1 comprising a luminaire head H mounted on a pole P. The luminaire head H may be connected to the luminaire pole P in any manner known to the skilled person. Typical examples of such systems are street lights. In other embodiments, the luminaire head H may be connected to a wall or a surface, e.g. for illuminating buildings or tunnels.

The luminaire head H comprises a support 10 on which a plurality of first light sources 110 having a first color temperature T1 and a plurality of second light sources 210 having a second color temperature T2, are mounted. One or more first optical elements 120 are associated with the plurality of first light sources 110, and one or more second optical elements 220 are associated with the plurality of second light sources 210. Preferably, the first and second optical elements 120, 220 are mounted on the support 10. For example, the first and second optical elements 120, 220 may be lens plates mounted over the first and second plurality of light sources 110, 210, as shown in FIG. 1A and FIG. 2A. The second color temperature T2 is different from the first color temperature T1.

The luminaire system 1 further comprises a drive and control means 300 configured to drive and control the plurality of first light sources 110 according to a first profile P1 and the plurality of second light sources 210 according to a second profile P2 different from the first profile P1, see FIGS. 1B and 1C. It is noted that the drive and control means 300 may be a single unit or may comprise multiple units located at the same location or at different locations. The drive and control means 300 may be arranged in the luminaire head or in another suitable location, e.g. in the pole or at a location near the luminaire. Also, the controlling may be done based on messages received from a remote location. For example, such message may be included in the first and/or second profile to be used. The first profile P1 defines a first drive output O1 as a function of time and the second profile P2 defines a second drive output O2 as a function of time. The first and second drive outputs are representative for the first and second drive currents used to drive the plurality of first and second light sources, respectively. These profiles P1, P2 may be preprogrammed profiles or profiles which are a function of received or sensed data. For example, in FIG. 1B, the illustrated profiles may be preprogrammed profiles. In the example of FIG. 1C, the profiles are influenced by events E1, E2. A first event E1 at time t1 triggers a temporary change in the first and second drive output O1, O2. Similarly a second event E2 at a later time t2 triggers a temporary change in the first and second drive output O1, O2. Such events may be associated with sensed or received data.

The plurality of first light sources 110 is configured to emit a first light beam through the one or more first optical elements 120 and the plurality of second light sources 210 is configured to emit a second light beam through the one or more second optical elements 220. The plurality of first light sources 110 and the one or more first optical elements 120 are configured to output the first light beam according to a first intensity distribution D1 within a first solid angle $\Omega 1$, see FIGS. 1A and 1E. The plurality of second light sources 210 and the one or more second optical elements 220 are configured to output the second light beam according to a second intensity distribution D2 within a second solid angle $\Omega 2$, see FIGS. 1A and 1D. The second intensity distribution D2 is different from the first intensity distribution D1. Typically, this is achieved by selecting the one or more second optical elements 220 to be different from the one or more first optical elements 120. However, this may also be achieved by positioning the plurality of first light sources 110 according to a different arrangement with respect to the one or more first optical elements 120 compared to the plurality of second light sources 210 with respect to the one or more second optical elements 220. In the latter case, a second optical element may be e.g. translated and/or rotated as compared to the position of the first optical element relative to the light source. Also in that manner the first intensity distribution will be different from the second intensity distribution. In yet another embodiment, so called double bulged lenses may be used, as described above.

In the example of FIG. 1B, a maximal value $O2_{max}$ of the second drive output O2 is lower than a maximal value $O1_{max}$ of the first drive output O1. For example, the plurality of first light sources 110 may be on during daytime/evening, and the plurality of second light sources 210 may be on during nighttime. Also, the second color temperature T2 may be lower than the first color temperature T1, in order to obtain a white light during daytime/evening and a more yellow light during nighttime. For example, the first color temperature T1 may be comprised between 2700 K and 4000 K and the second color temperature T2 may be comprised between 1500 K and 2700 K.

In the example of FIG. 1C, a maximal value $O2_{max}$ of the second drive output O2 is higher than a maximal value $O1_{max}$ of the first drive output O1. Such example may be useful for other applications.

Figure 1E:
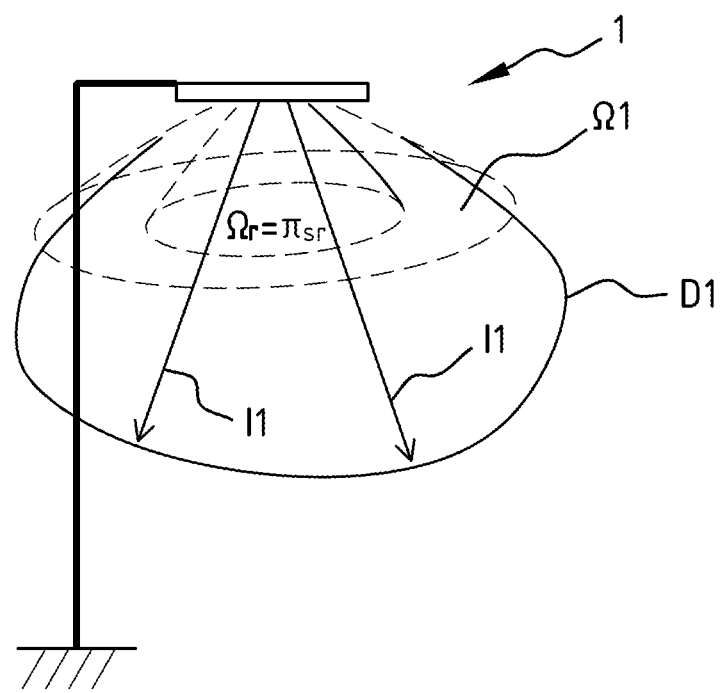
Figure 2A:
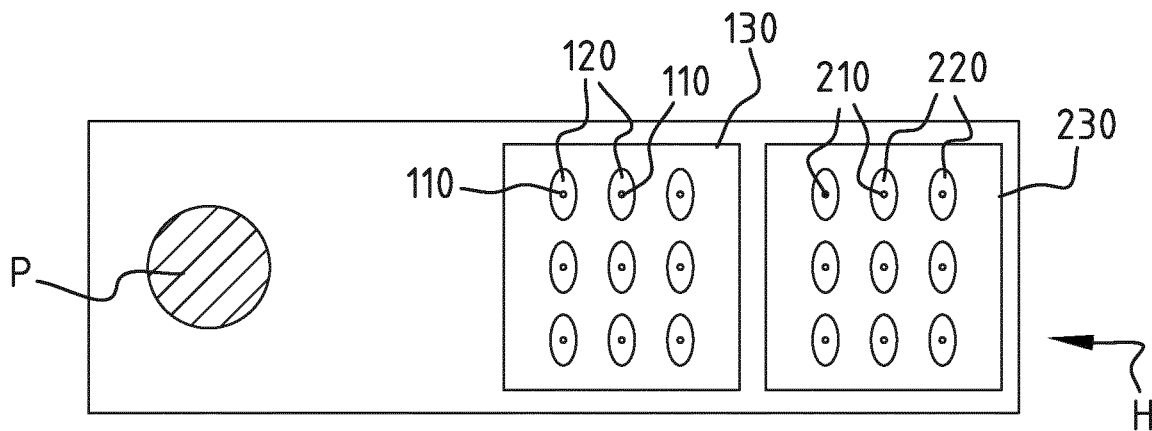
FIGS. 2A-2E illustrate schematically bottom views of exemplary embodiments of luminaire heads.

As shown in FIGS. 1A and 1D and 1E, the second solid angle $\Omega 2$ may be smaller than the first solid angle $\Omega 1$, or stated differently, the second intensity distribution may correspond with a smaller illuminated surface area than that of the first intensity distribution. For example, the first solid angle $\Omega 1$ may be comprised between $3\pi/2$ sr and $2\pi$ sr and the second solid angle $\Omega 2$ may be comprised between $\pi$ sr and $3\pi/2$ sr.

As illustrated in FIG. 1E, the plurality of first light sources 110 and the one or more first optical elements 120 may be configured such that the luminous flux within a solid angle region Ωr of the first solid angle Ω1 between 0 and π sr (the luminous flux corresponds with the integration of the luminous intensity I1 over Ωr) is comprised between 60% and 75% of the total luminous flux caused by the first drive output O1. Similarly, as illustrated in FIG. 1D, the plurality of second light sources 210 and the one or more second optical elements 220 may be configured such that the luminous flux within a solid angle region Ωr of the second solid angle Ω2 between 0 and π sr is comprised between 75% and 90% of the total luminous flux caused by the second drive output O2. In FIG. 1D, the luminous flux within solid angle region Ωr corresponds with the integration of the luminous intensity I2 over Ωr.

As shown in FIG. 1A, the first intensity distribution D1 and the second intensity distribution D2 at least partially overlap. This will allow to obtain a gradual transition from the first to the second intensity distribution and/or to have an area with a higher intensity (in the overlap area) and an area with a lower intensity (outside of the overlap area).

The drive and control means 300 may be configured to perform a transition from driving the plurality of first light sources 110 to driving the plurality of second light sources 210, and vice versa. For example, as illustrated for example in FIG. 1B, the transition may be progressive. For example, the first drive output O1 may be gradually lowered as the second drive output O2 is increased.

FIGS. 2A-2E illustrate a number of possible LED and optical element arrangements for use in embodiments of the invention. The example of FIG. 2A corresponds with the example of FIG. 1A and has been discussed above. As shown the plurality of first light sources 110 is arranged according to a first array covered by a first optical plate 130 integrating a plurality of optical elements 120, typically lens elements. Similarly, the plurality of second light sources 210 is arranged according to a second array covered by a second optical plate 230 integrating a plurality of optical elements 220, typically lens elements. All first light sources 110 may be connected in series in a first branch. Similarly, all second light sources 210 may be connected in series in a second branch.

Figure 2B:
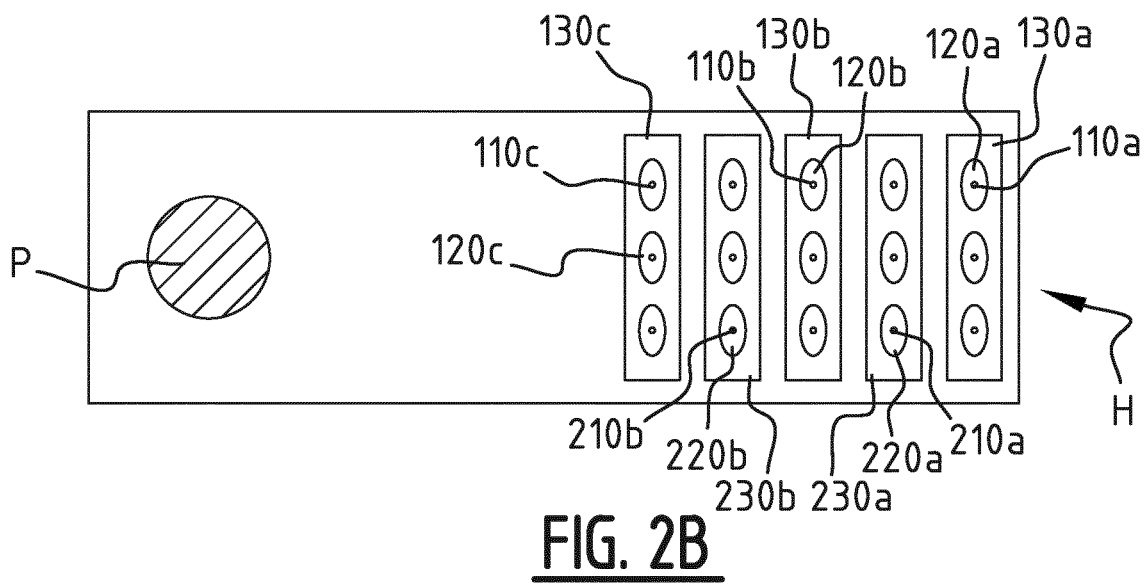

In the example of FIG. 2B, the plurality of first light sources 110a, 110b, 110c is arranged in three columns, and between each pair of adjacent columns of first light sources 110a, 110b, 110c a column of second light sources 210a, 210b is arranged. The first column of first light sources 110a is associated with an optical plate 130a integrating multiple optical elements 120a, preferably lens elements. The second column of first light sources 110b is associated with an optical plate 130b integrating multiple optical elements 120b, preferably lens elements. The third column of first light sources 110c is associated with an optical plate 130c integrating multiple optical elements 120c, preferably lens elements. A first column of second light sources 210a is associated with an optical plate 230a integrating multiple optical elements 220a, preferably lens elements, and is arranged between the first and second column of first light sources 110a, 110b. A second column of second light sources 210b is associated with an optical plate 230b integrating multiple optical elements 220b, preferably lens elements, and is arranged between the second and third column of first light sources 110b, 110c. All first light sources 110a, 110b, 110c may be connected in series in a first branch. Similarly, all second light sources 210a, 210b may be connected in series in a second branch. The drive and control means 300 may then send an output current though the first and/or second branch.

Figure 2C:
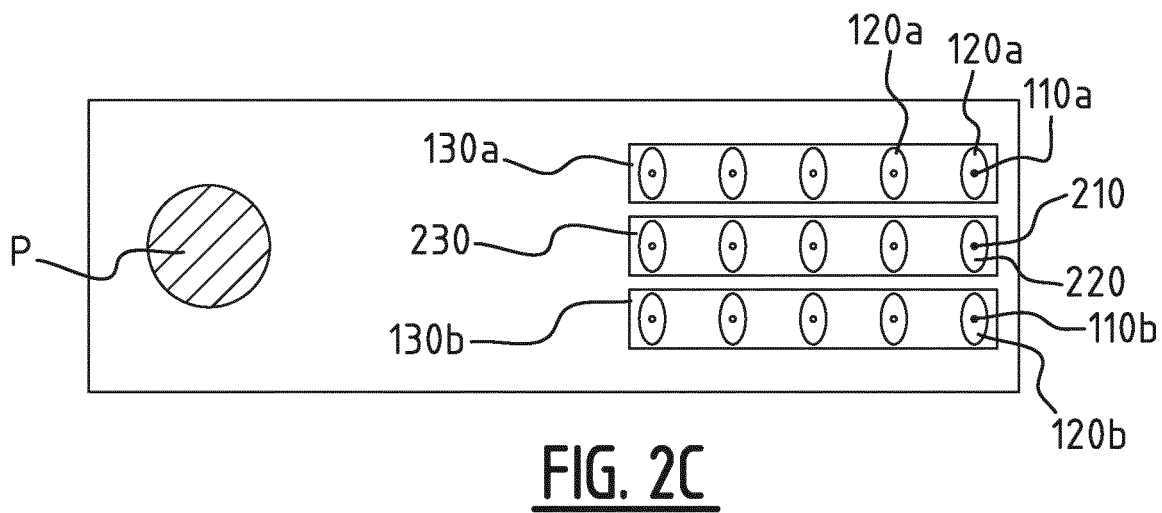

FIG. 2C illustrates yet another possible embodiment where first light source elements 110a, 110b are arranged in rows, and the second light source elements 210 are arranged in a row between two rows of first light source elements 110a, 110b. The first row of first light sources 110a is associated with an optical plate 130a integrating multiple optical elements 120a, preferably lens elements. The second row of first light sources 110b is associated with an optical plate 130b integrating multiple optical elements 120b, preferably lens elements. A row of second light sources 210 is associated with an optical plate 230 integrating multiple optical elements 220, preferably lens elements, and is arranged between the first and second row of first light sources 110a, 110b. All first light sources 110a, 110b may be connected in series in a first branch. Similarly, all second light sources 210 may be connected in series in a second branch.

In FIGS. 2B and 2C, a column is oriented in a direction perpendicular to a length direction of the luminaire head H, i.e. typically a direction which is substantially parallel to a road direction, and a row is oriented in a direction parallel to a length direction of the luminaire head H, i.e. typically a direction which is substantially perpendicular to a road direction.

Figure 2D:
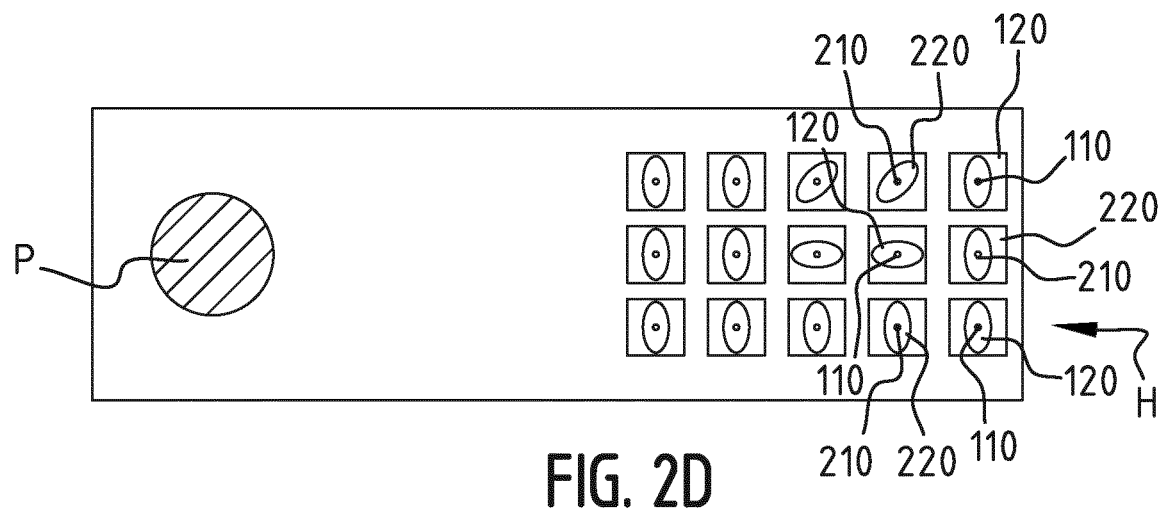

FIG. 2D illustrates yet another embodiment where an individual optical element 120, 220 is provided for each light source 110, 210, and where the first and second light sources 110, 210 are intermingled according to a checkerboard pattern. As illustrated, different optical elements 120, 220 may be included. Many other patterns are also possible, depending on the desired first and second intensity distribution.

Figure 2E:
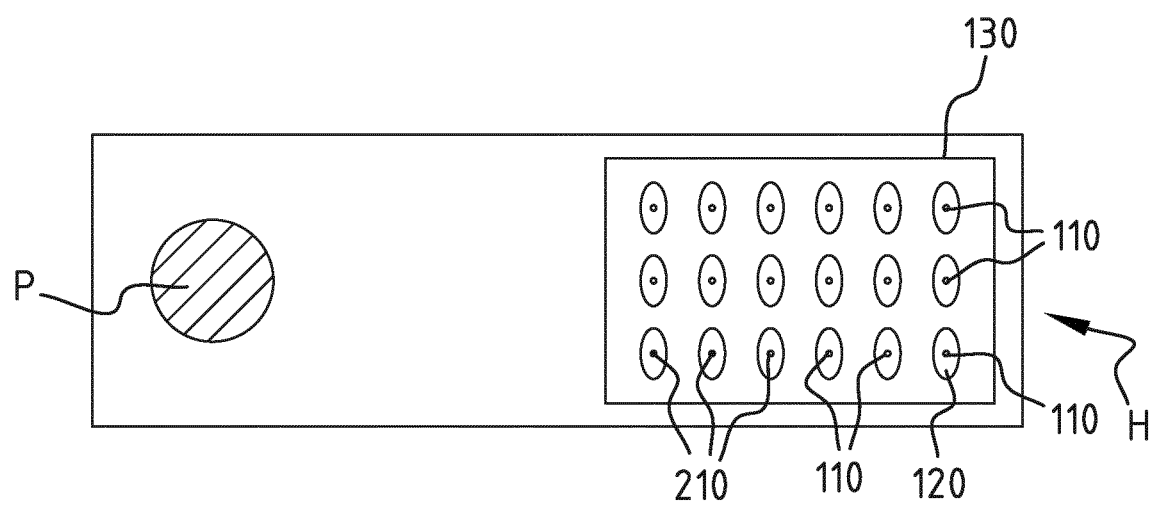

Finally, FIG. 2E illustrates an embodiment where a single optical plate 130, e.g. a lens plate, integrating the first and second optical elements 120, 220, is provided for both the first and the second light sources 110, 210.

Figure 6A:
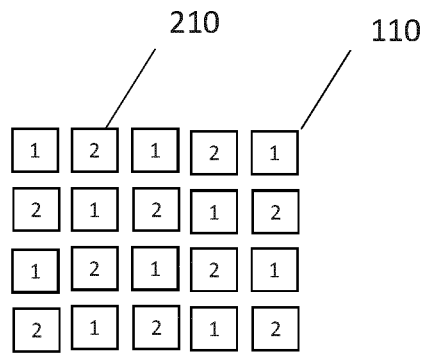
FIGS. 6A-6D illustrate schematically different light source patterns which may be used in exemplary embodiments.
Figure 6B:
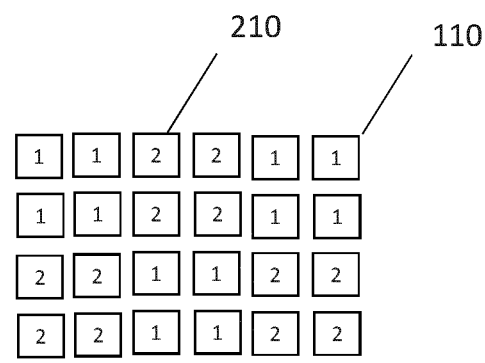
Figure 6C:
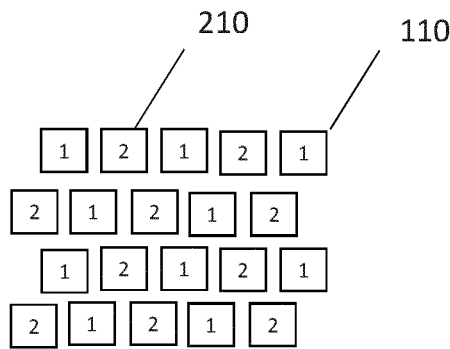
Figure 6D:
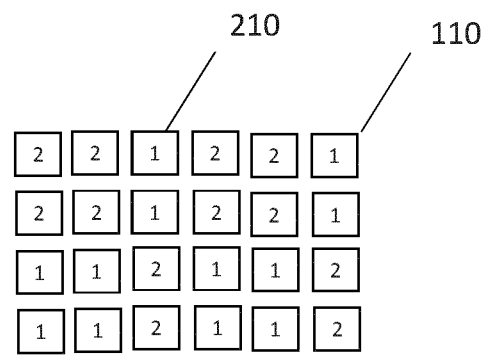

FIGS. 6A-6D illustrate further embodiments of patterns that may be used for arranging the light sources in the luminaire head. In the embodiments of FIGS. 6A-6D, the plurality of first light sources 110 comprises multiple first sets each comprising one or more adjacent first light sources and the plurality of second light sources 210 comprises multiple second sets each comprising one or more adjacent second light sources. In FIGS. 6A and 6C each first set comprises a single first light source 110 and each second set comprises a single second light source 210. In FIG. 6B each first set comprises four adjacent first light sources 110 and each second set comprises four adjacent second light sources 210. In FIG. 6D a first set comprises two or four first light sources 110 and a second set comprises two or four second light sources 210. In FIGS. 6A-6D, the first and second sets are arranged such that each first set is adjacent to at least two second sets: indeed, the first sets located in the corners have two adjacent second sets and the other first sets have three or four adjacent second sets. The first and the second sets are arranged according to a checkerboard pattern. It is noted that the tiles of the checkerboard pattern (corresponding with the sets) may be rectangular or square. For example, instead of a more or less square set of four light sources, a rectangular set of six light sources may be envisaged. Also, as illustrated in FIG. 6C, rows of the checkerboard pattern may be shifted with respect to each other. Preferably, each set of one or more first light sources comprises at most four first light sources and/or each set of one or more second light sources comprises at most four second light sources. However, also larger sets are possible. By using such patterns an improved color mixing can be obtained.

It is noted that the light sources illustrated in FIGS. 6A-6D may be combined with any optical elements. The optical elements may be grouped in plates with two or more optical elements or may be individual optical elements.

Although the examples above illustrate embodiments with lens elements, other types of optical elements may be additionally or alternatively present in such luminaires systems, such as reflectors, backlights, prisms, collimators, diffusors, light shielding structures and the like. Further, a lens element may include any transmissive optical element that focuses or disperses light by means of refraction. It may also include any one of the following: a reflective portion, a backlight portion, a prismatic portion, a collimator portion, a diffusor portion.

Figure 3A:
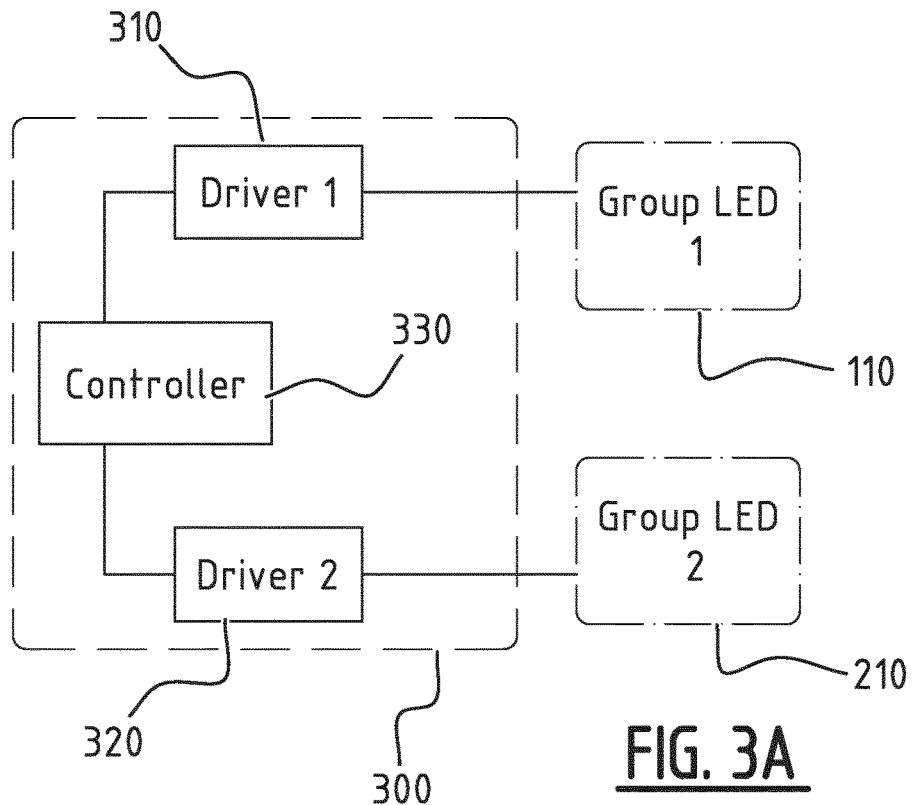
FIGS. 3A-3D illustrate various embodiments of drive and control means for use in embodiments of the invention.

FIG. 3A illustrates a possible embodiment of a drive and control means 300 for driving a plurality of first LEDs 111 and a plurality of second LEDs 210. The drive and control means 300 comprises a first driver 310 configured to drive the plurality of first LEDs 110, a second driver 320 configured to drive the plurality of second LEDs 210, and a controller 330 to control the first and second driver 310, 320 in accordance with the first and second profile defined above.

Figure 3B:
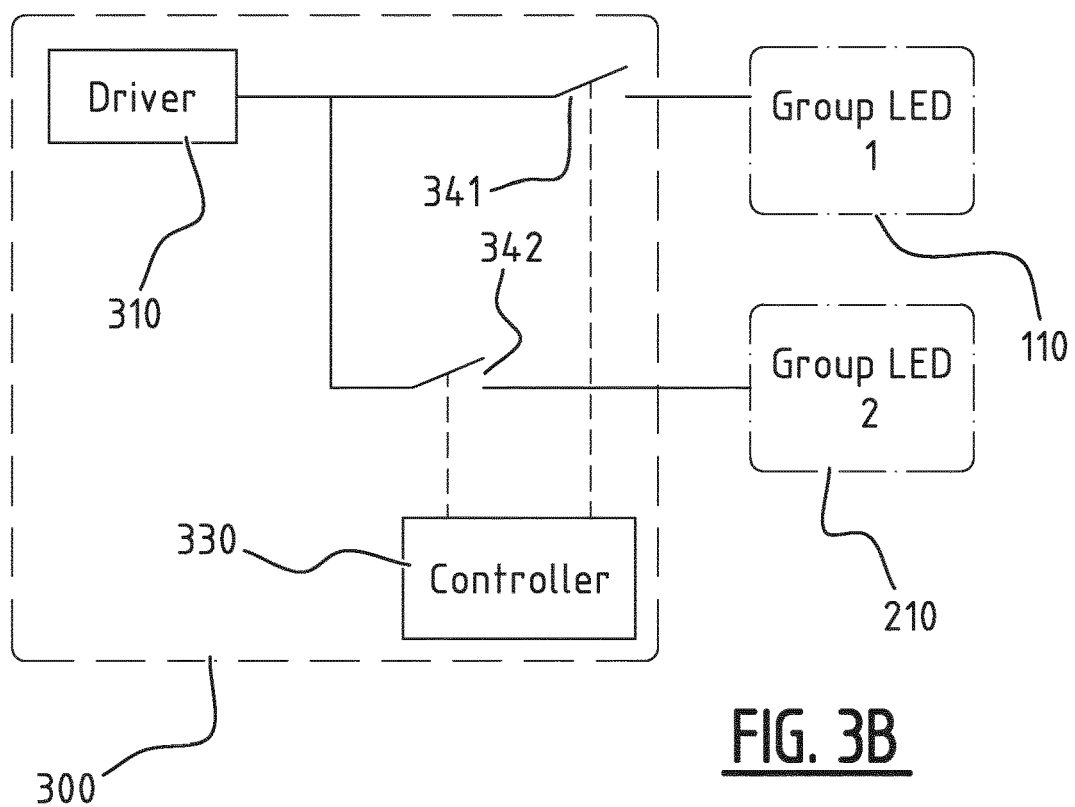

FIG. 3B illustrates another embodiment of a drive and control means 300 for driving a plurality of first LEDs 110 and a plurality of second LEDs 210. The drive and control means 300 comprises a driver 310 configured to drive the plurality of first LEDs 110 and the plurality of second LEDs 210. The driver 310 is connected to the first LEDs 110 through a first branch comprising a first switch 341 and to the second LEDs 210 through a second branch comprising a second switch 342. A controller 330 controls the first and second switches 341, 342 depending on whether the first and/or the second LEDs need to be powered.

Figure 3C:
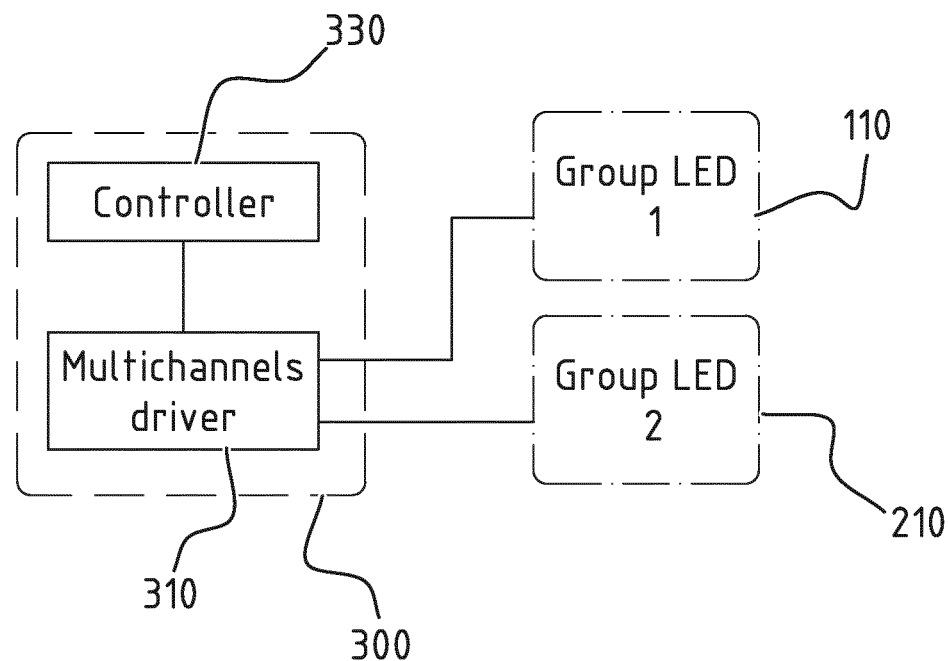

FIG. 3C illustrates yet another embodiment of a drive and control means 300 for driving a plurality of first LEDs 110 and a plurality of second LEDs 210. The drive and control means 300 comprises a multi-channels driver 310 configured to drive the plurality of first LEDs 110 and the plurality of second LEDs 210. The driver 310 is connected to the first LEDs 110 through a first branch and to the second LEDs 210 through a second branch. A controller 330 controls the multi-channels driver 310 depending on whether the first and/or the second LEDs need to be powered.

Figure 3D:
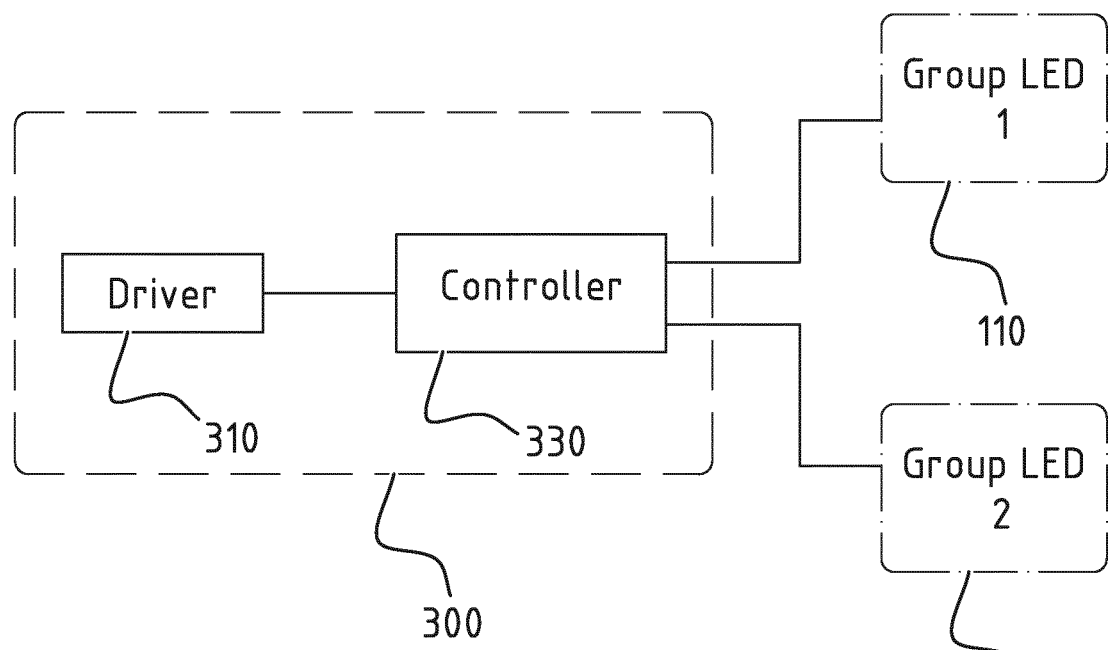

FIG. 3D illustrates yet another embodiment of a drive and control means 300. The drive and control means 300 comprises a driver 310 configured to drive the plurality of first LEDs 110 and the plurality of second LEDs 210 through a controller 330. The controller 330 is connected to the first LEDs 110 through a first branch and to the second LEDs 210 through a second branch. The controller 330 routes the output of the driver 310 depending on whether the first and/or the second LEDs need to be powered.

As illustrated in FIG. 1A, the luminaire system may further comprise a sensing means 400, and the drive and control means 300 may be configured to vary the first drive output O1 and/or the second drive output O2 based on data sensed by the sensing means 400. For example, in FIG. 1C the events E1 and E2 may be detected based on sensed data. Thus the sensed data may trigger a change of the first and/or second drive output. The sensing means 400 may comprise any one or more of a presence sensor (e.g. for sensing the presence of a person or an animal or a flying object such as a drone), an ambient light sensor, an ambient visibility sensor, a traffic sensor, a dust particle sensor, a sound sensor, an image sensor such as a camera, an astroclock, a temperature sensor, a humidity sensor, a ground condition measurement sensor such as a ground reflectivity sensor, a lighting pattern sensor, a speed detection sensor (e.g. for sensing the speed of a moving object). The sensing means 400 may sense data, and the first profile and/or the second profile may be determined or selected based on the sensed data.

As illustrated in FIG. 1A, the luminaire system may further comprise a receiving means 500 configured to receive a message from a remote location, e.g. a central server or a neighboring luminaire, and the drive and control means 300 may be configured to vary the first drive output O1 and/or the second drive output O2 based on the received message. The receiving means 500 receive a message from a remote location and may vary the first profile and/or the second profile based on the received message. For example, traffic information or weather information may be communicated, and the first and/or second profile may be changed based on the traffic information or on the weather information.

In a preferred embodiment, the luminaire system further comprises a storing means 600 configured to store a plurality of drive profiles. The drive and control means 300 is configured to select a drive profile among the plurality of stored drive profiles, e.g. based on sensed data or based on a received message, and to vary the first drive output O1 and/or the second drive output O2 according to the selected drive profile. The drive profiles may comprise one or more standard profiles describing the intensities in function of time, e.g. for every day of the year, but may also be event related profiles, e.g. a profile to be used when a certain type of animal has been detected or when a certain weather condition has been detected. Optionally, when the luminaire system allows powering only a portion of the first light source and/or only a portion of the second light sources, the stored drive profiles may comprise information about the amount of first light sources 110 and/or of the amount of second light sources 210 to be powered.

In a preferred embodiment, the one or more first optical elements 120 comprise a plurality of first lens elements 120 associated with the plurality of first light sources 110 and the one or more second optical elements 220 comprise a plurality of second lens elements 220 associated with the plurality of second light sources 210, as shown in FIG. 1A. The plurality of first optical elements 120 and/or the plurality of second optical elements 220 may be integrated in an optical plate 130, 230. FIG. 1A illustrates an embodiment with two optical plates, but the skilled person understands that in alternative embodiments the first and second optical elements 120, 220 may be integrated in the same plate, as illustrated in FIG. 2E.

Figure 4A:
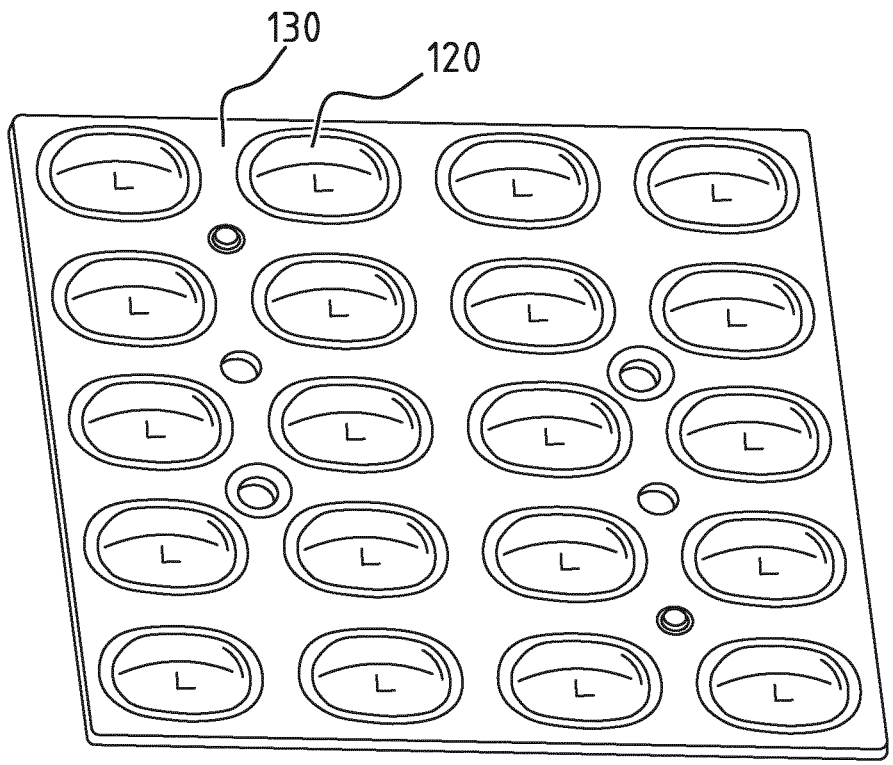
FIG. 4A is a perspective view of a lens plate for use in embodiments of the invention.
Figure 4B:
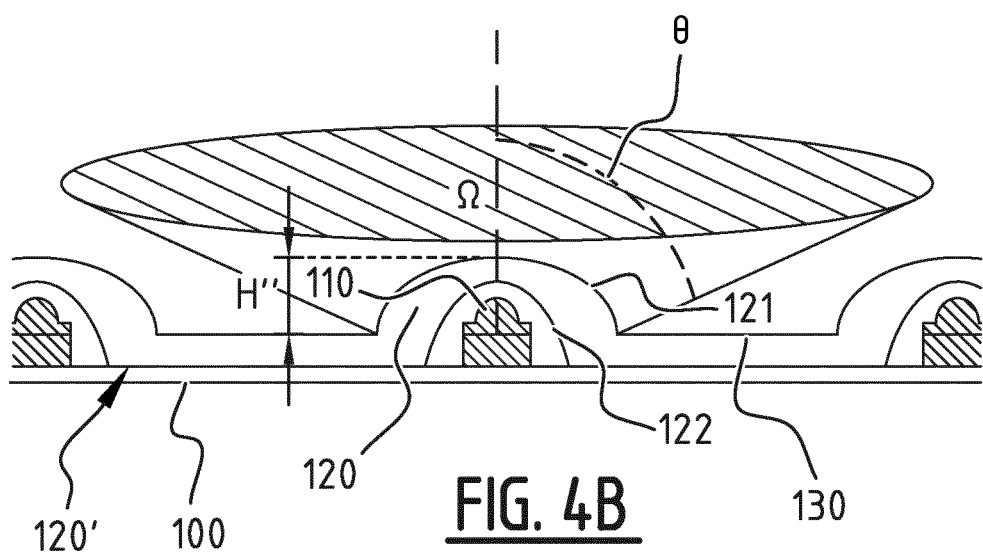
FIG. 4B is a cross-sectional view of a detail of a lens plate arranged above a plurality of light sources.

FIGS. 4A and 4B illustrate an example of an embodiment, where the plurality of first optical elements 120, here lens elements 120, are integrated in an optical plate 130. FIG. 4B illustrates the solid angle Ω for a single light source 110 and associated lens element 120. The solid angle Ω1 of the plurality of first light source 110 and associated lens elements 210 corresponds with the envelope delimitating the superposition of all solid angles Ω of the plurality of first light source 110.

Preferably, the plurality of first light sources 110 is arranged in a two-dimensional array of at least two rows and at least two columns and the plurality of second light sources is arranged in a two-dimensional array of at least two rows and at least two columns. The optical elements, preferably lens elements 120, 220 may then be arranged correspondingly, such that each first light source is covered by a lens element 120, 220. Note that a first light source 110 may comprise a single LED or may comprise multiple LEDs. Also, a second light source 210 may comprise a single LED or may comprise multiple LEDs.

Figure 4C:
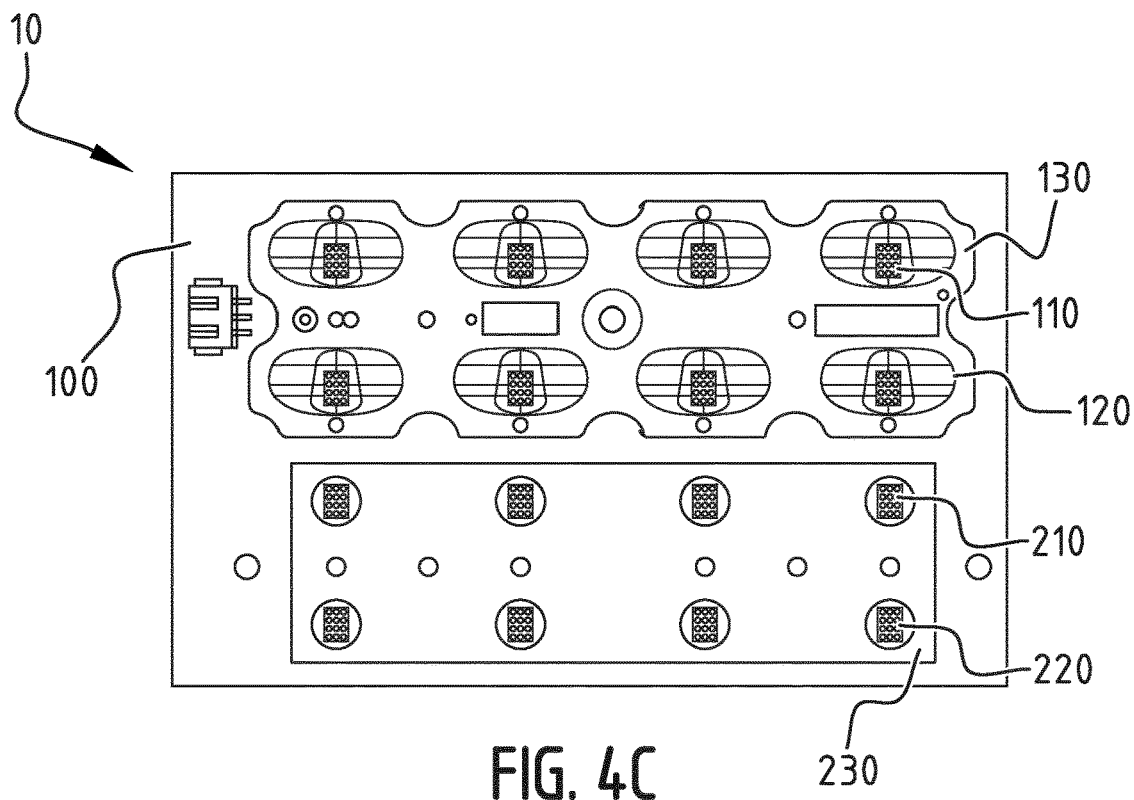
FIG. 4C illustrates a top view of a support with two lens plates for use in embodiments of the invention.

The support 10 may consist of a single PCB 100 for both the first and second light sources 110, 210. Such an embodiment is illustrated in FIG. 4C. In the embodiment of FIG. 4C, the first lens elements 120 are integrated in a first optical plate 130, and the second lens elements 220 are integrated in a second optical plate 230. Alternatively (not shown), the support 10 may comprise a first PCB comprising the plurality of first light sources 110 and a second PCB comprising the plurality of second light sources 210.

Figure 5A:
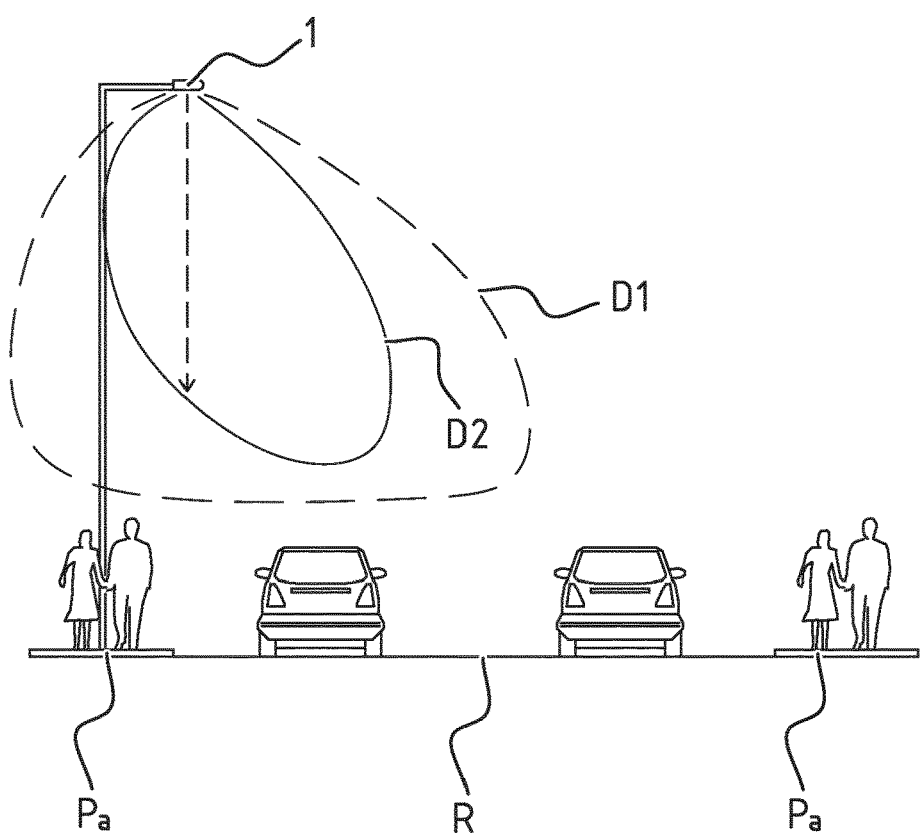
FIGS. 5A and 5B illustrate a possible application of an embodiment of a luminaire system.
Figure 5B:
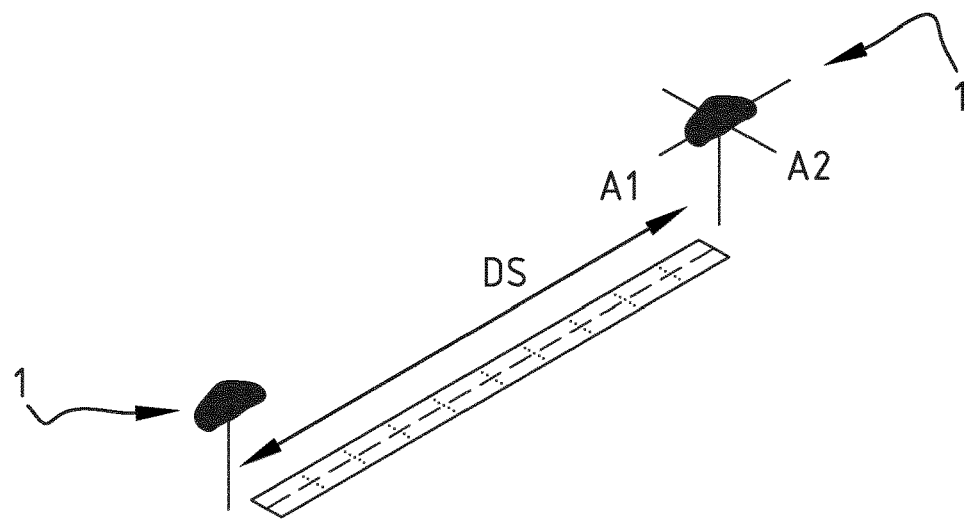
Figure 5C:
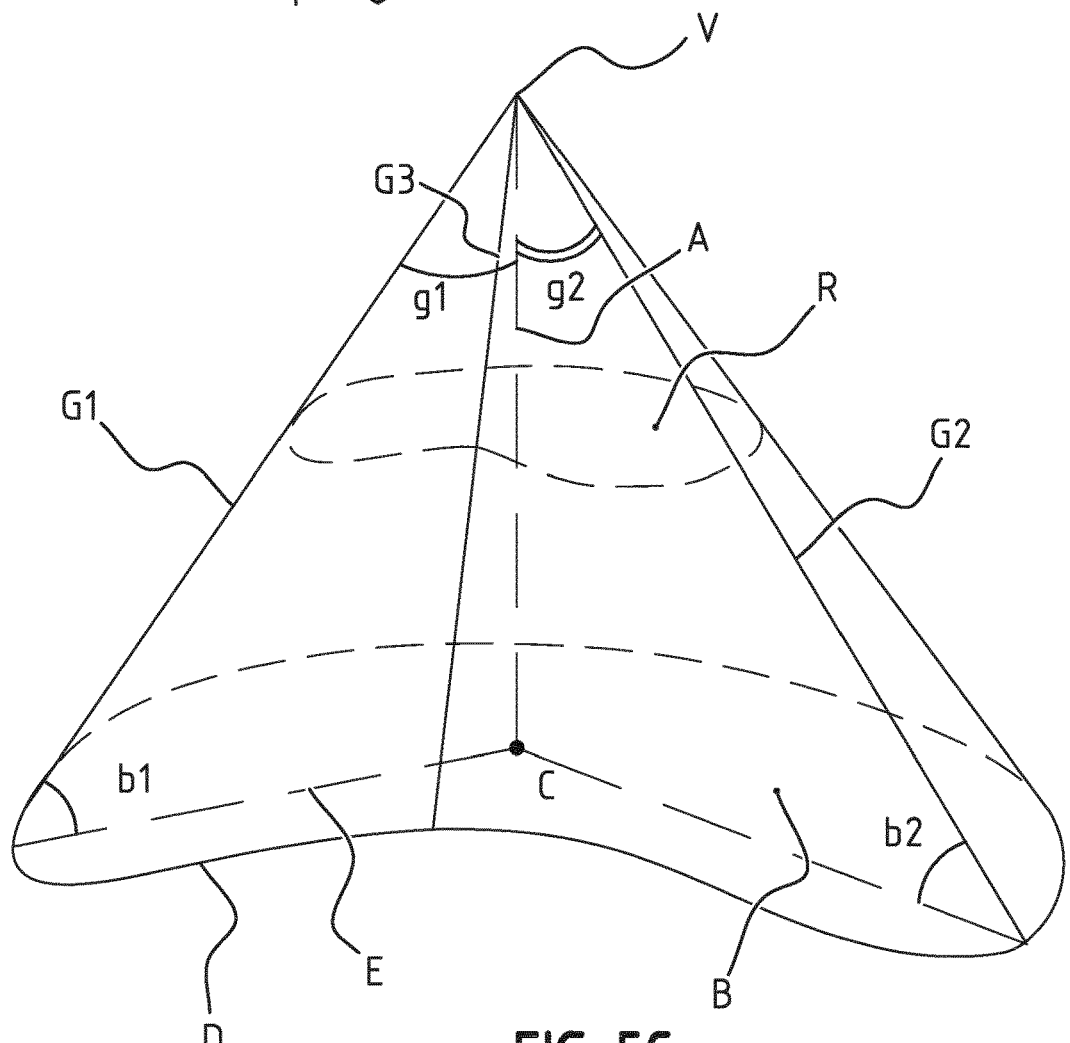
FIG. 5C illustrates the envelope delimiting a light beam generated by an embodiment of a luminaire system.

FIGS. 5A-5C illustrate an exemplary embodiment of a luminaire system 1 for illuminating a road R and a pavement Pa. The luminaire system is configured for generating a first intensity distribution D1 or a second intensity distribution D2, according to any one of the embodiments disclosed above.

The first light beam generated by the first plurality of light sources with the one or more first optical elements and having the first intensity distribution D1 may be delimited by a conical envelope, typically a non-circular conical envelope with a non-circular directrix D, e.g. an oblique non-circular conical envelope, as illustrated in FIG. 5C. The same is true for the second intensity distribution. The directrix D, i.e. the shape of a right section R of the non-circular conical envelope (i.e. a section through the conical envelope, perpendicular on the axis A of the conical envelope, the axis A being a straight line joining the vertex V with the centroid c of the base B) may be different for the first and second intensity distribution D1, D2. More in particular the non-circular conical envelope may comprise one or more outer generators G1, G2 at a local maximum angle g1, g2 with the axis A of the non-circular conical envelope. These one or more local maximum angles g1, g2 may be different for the first and second intensity distribution D1, D2. For example, for street lights the first light beam may be symmetrical with respect to the C90/C270 plane which is oriented perpendicular on the street direction. Preferably, also the angle b1, b2 between the plane of the base B and the one or more generators G1, G2 corresponding with the one or more local maximum angles g1, g2 (typically two local maxima will be present on either side of the C90/C270 plane, in case of a symmetrical light beam) is different for the first and second intensity distribution D1, D2. In that manner, depending on the time of the day and/or on certain sensed events and/or on a received message, the light beam can be adjusted by driving the first and/or second light sources according to a first and a second drive profile. For example, the second light beam generated by the plurality of second light sources can be more narrow (seen in a lateral direction of a lane) and longer (seen in a longitudinal direction of a lane) for illuminating a narrow lane, and the first light beam can be wider (seen in a lateral direction of a lane) for illuminating a wider lane. The vertex V corresponds with the location of the plurality of first and second light sources. The skilled person understands that in reality this may not be a single point, and that the representation of FIG. 5C is an approximation of the reality. FIG. 5B illustrates a view of a street with two luminaire systems 1 arranged at a distance DS from each other. By having a first and a second lens plate which are different, the shape of the generated light beam can be changed and adapted in function of the time, based on the area of the road that needs to be illuminated and/or based on sensed or received data, as explained above. Indeed, the light beam may correspond to a first light beam generated by the first plurality of light sources or a second light beam generated by the second plurality of light sources or a combination of the first and the second light beam, depending on the needs.

Whilst the principles of the invention have been set out above in connection with specific embodiments, it is to be understood that this description is merely made by way of example and not as a limitation of the scope of protection which is determined by the appended claims.

The invention claimed is:

1. A An outdoor luminaire system comprising:
a support comprising a plurality of first light sources and a plurality of second light sources;
one or more first optical elements associated with the plurality of first light sources;
one or more second optical elements associated with the plurality of second light sources; and
a drive and control means configured to drive and control the plurality of first light sources according to a first profile and the plurality of second light sources according to a second profile different from the first profile,
wherein the first profile defines a first drive output as a function of time and the second profile defines a second drive output as a function of time,
wherein the plurality of first light sources and the one or more first optical elements are configured to output a first light beam having a first color temperature according to a first intensity distribution within a first solid angle, and
wherein the plurality of second light sources and the one or more second optical elements are configured to output a second light beam having a second color temperature according to a second intensity distribution within a second solid angle, said second intensity distribution being different from the first intensity distribution and said first color temperature being different from said second color temperature.

2. The outdoor luminaire system according to claim 1, wherein the one or more second optical elements are different from the one or more first optical elements.

3. The outdoor luminaire system according to claim 1, wherein a maximal value of the second drive output is lower than a maximal value of the first drive output.

4. The outdoor luminaire system according to claim 1, wherein the plurality of first light sources is configured to emit light having the first color temperature, and wherein the plurality of second light sources is configured to emit light having the second color temperature.

5. The outdoor luminaire system according to claim 1, wherein the plurality of first and second light sources and the one or more first and second optical elements are configured such that a luminous flux within a region of the first solid angle between 0 and $\pi$ sr is comprised between 60% and 75% of the total luminous flux caused by the first drive output; and such that the luminous flux within a region of the second solid angle between 0 and $\pi$ sr is comprised between 75% and 90% of the total luminous flux caused by the second drive output.

6. The outdoor luminaire system according to claim 1, wherein the second color temperature is lower than the first color temperature, and wherein the first color temperature is comprised between 2700 K and 4000 K and the second color temperature is comprised between 1500 K and 2700 K.

7. The outdoor luminaire system according to claim 1, wherein the second solid angle is smaller than the first solid angle.

8. The outdoor luminaire system according to claim 7, wherein the first solid angle is comprised between $3\pi/2$ sr and $2\pi$ sr and the second solid angle is comprised between $\pi$ sr and $3\pi/2$ sr.

9. The outdoor luminaire system according to claim 1, wherein the first intensity distribution and the second intensity distribution at least partially overlap.

10. The outdoor luminaire system according to claim 1, wherein the drive and control means is configured to perform a transition from driving only the plurality of first light sources to driving only the plurality of second light sources and vice versa.

11. The outdoor luminaire system according to claim 1, wherein the drive and control means is configured to gradually decrease the first drive output whilst gradually increasing the second drive output and vice versa.

12. The outdoor luminaire system according to claim 1, wherein the drive and control means comprises a first driver configured to drive the plurality of first light sources and a second driver configured to drive the plurality of second light sources.

13. The outdoor luminaire system according to claim 1, further comprising at least one of:
   a sensing means, wherein the drive and control means is configured to vary the first and/or the second drive output based on data sensed by the sensing means; or
   a receiving means configured to receive a message from a remote location, wherein the drive and control means is configured to vary the first drive output and/or the second drive output based on the received message; or
   a storing means configured to store a plurality of drive profiles, wherein the drive and control means is configured to select one of the stored profiles and to vary the first drive output and/or the second drive output according to the selected drive profile.

14. The outdoor luminaire system according to claim 1, wherein the support comprises a first printed circuit board comprising the plurality of first light sources and a second printed circuit board comprising the plurality of second light sources, and/or
   wherein the one or more first optical elements comprise a plurality of first lens elements associated with the plurality of first light sources and the one or more second optical elements comprise a plurality of second lens elements associated with the plurality of second light sources, and/or
   wherein the one or more first optical elements and/or the one or more second optical elements are integrated in an optical plate.

15. The outdoor luminaire system according to claim 1, wherein the plurality of first light sources is arranged in a two-dimensional array of at least two rows and at least two columns and/or the plurality of second light sources is arranged in a two-dimensional array of at least two rows and at least two columns.

16. The outdoor luminaire system according to claim 1, wherein a distance between adjacent first light sources seen in a row direction is substantially constant and a distance between adjacent first light sources seen in a column direction perpendicular on the row direction is substantially constant, and/or wherein a distance between adjacent second light sources seen in a row direction is substantially constant and a distance between adjacent second light sources seen in a column direction perpendicular on the row direction is substantially constant.

17. The outdoor luminaire system according to claim 1, wherein the plurality of first light sources comprises multiple first sets each comprising one or more adjacent first light sources and the plurality of second light sources comprises multiple second sets each comprising one or more adjacent second light sources, and wherein the first and second sets are arranged such that each first set is adjacent to at least two second sets.

18. The outdoor luminaire system according to claim 1, wherein a difference between the first and the second color temperature is larger than 500 K.

19. A luminaire system comprising:
   a support comprising a plurality of first light sources and a plurality of second light sources;
   one or more first optical elements associated with the plurality of first light sources;
   one or more second optical elements associated with the plurality of second light sources; and
   a drive and control means configured to drive and control the plurality of first light sources according to a first profile and the plurality of second light sources according to a second profile different from the first profile,
   wherein the first profile defines a first drive output as a function of time and the second profile defines a second drive output as a function of time,
   wherein the plurality of first light sources and the one or more first optical elements are configured to output a first light beam having a first color temperature according to a first intensity distribution within a first solid angle,
   wherein the plurality of second light sources and the one or more second optical elements are configured to output a second light beam having a second color temperature according to a second intensity distribution within a second solid angle, and
   wherein the plurality of first and second light sources and the one or more first and second optical elements are configured such that the luminous flux within a region of the first solid angle between 0 and $\pi$ sr is comprised between 60% and 75% of the total luminous flux caused by the first drive output; and such that the luminous flux within a region of the second solid angle between 0 and $\pi$ sr is comprised between 75% and 90% of the total luminous flux caused by the second drive output.

20. A luminaire system comprising:
   a support comprising a plurality of first light sources and a plurality of second light sources;
   one or more first optical elements associated with the plurality of first light sources;
   one or more second optical elements associated with the plurality of second light sources; and
   a drive and control means configured to drive and control the plurality of first light sources according to a first profile and the plurality of second light sources according to a second profile different from the first profile,
   wherein the first profile defines a first drive output as a function of time and the second profile defines a second drive output as a function of time,
   wherein the plurality of first light sources and the one or more first optical elements are configured to output a first light beam having a first color temperature according to a first intensity distribution within a first solid angle,
   wherein the plurality of second light sources and the one or more second optical elements are configured to output a second light beam having a second color temperature according to a second intensity distribution within a second solid angle, wherein the second solid angle is smaller than the first solid angle, wherein the drive and control means is configured to perform a transition from driving only the plurality of first light sources to driving only the plurality of second light sources and vice versa, and wherein the first solid angle is comprised between $3\pi/2$ sr and $2\pi$ sr and the second solid angle is comprised between $\pi$ sr and $3\pi/2$ sr.

* * * * *